United States Patent
Hatanaka

(10) Patent No.: US 10,132,973 B2
(45) Date of Patent: Nov. 20, 2018

(54) ELLIPTICALLY POLARIZING PLATE

(71) Applicant: Sumitomo Chemical Company, Limited, Chuo-ku, Tokyo (JP)

(72) Inventor: Nobuyuki Hatanaka, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/456,866

(22) Filed: Mar. 13, 2017

(65) Prior Publication Data

US 2017/0269271 A1 Sep. 21, 2017

(30) Foreign Application Priority Data

Mar. 15, 2016 (JP) ................. 2016-051544
Dec. 20, 2016 (JP) ................. 2016-247129

(51) Int. Cl.
*G02B 5/30* (2006.01)

(52) U.S. Cl.
CPC ........... *G02B 5/3016* (2013.01); *G02B 5/305* (2013.01); *G02B 5/3083* (2013.01)

(58) Field of Classification Search
CPC .................................................. G02B 5/3016
See application file for complete search history.

(56) References Cited

U.S. PATENT DOCUMENTS

2006/0232733 A1* 10/2006 Shibazaki ............. G02F 1/1393
349/117
2007/0128382 A1* 6/2007 Hayashi ............... G02B 5/3016
428/1.31

(Continued)

FOREIGN PATENT DOCUMENTS

EP 1045261 A1 10/2000
JP 3325560 B2 9/2002

(Continued)

OTHER PUBLICATIONS

Office Action dated Mar. 28, 2017 in JP Application No. 2016-247129.
Office Action dated Aug. 8, 2017 in JP Application No. 2016-247129.
Office Action dated Feb. 5, 2018 in CN application No. 201710133841.3.
Office Action dated Jul. 4, 2017 in KR Application No. 10-2017-0022843.

(Continued)

*Primary Examiner* — Sang V Nguyen
(74) *Attorney, Agent, or Firm* — Panitch Schwarze Belisario & Nadel LLP

(57) ABSTRACT

An elliptically polarizing plate includes a polarizing plate and a retardation plate. The elliptically polarizing plate satisfies the following:

$0.8 \leq P(450)/P(650) \leq 1.2$ $P(550) \geq 0.7$ $Re(450) < Re(550) < Re(650)$ $0.05 < 1 - P(450) < 0.3$ Re(550) and Re(650) represent the front retardation at wavelengths ($\lambda$) of 450 nm, 550 nm and 650 nm, respectively. P(450), P(550) and P(650) represent the elliptically polarized light states (P($\lambda$)) at wavelengths ($\lambda$) of 450 nm, 550 nm and 650 nm, respectively. $P(\lambda) = \tan\{\sin^{-1}(I1(\lambda) \times \sin \Pi(\lambda) \times \sin 2\theta - I2(\lambda) \times \sin \Pi(\lambda) \times \cos 2\theta)/I2(\lambda))/2\}$. $I1(\lambda) = (10^{-A1(\lambda)} - 10^{-A2(\lambda)})/2$. $I2(\lambda) = (10^{-A1(\lambda)} + 10^{-A2(\lambda)})/2$. $\Pi(\lambda) = Re(\lambda)/\lambda \times 2\pi$. $A1(\lambda)$ and $A2(\lambda)$ represent the absorbance in the transmission and adsorption axis directions, respectively, of the polarizing plate at wavelength ($\lambda$). Re($\lambda$) represents the front retardation at wavelength ($\lambda$). $\theta$ represents the angle formed by the polarizing plate absorption axis and the retardation plate slow axis.

9 Claims, 1 Drawing Sheet

(56) References Cited

U.S. PATENT DOCUMENTS

| | | | | |
|---|---|---|---|---|
| 2008/0043332 | A1* | 2/2008 | Chiba | G02B 5/3033 359/489.03 |
| 2008/0291389 | A1* | 11/2008 | Kawamoto | G02B 5/3016 349/194 |
| 2009/0091692 | A1* | 4/2009 | Nagai | G02F 1/133634 349/96 |
| 2009/0296027 | A1* | 12/2009 | Kawamoto | B32B 23/08 349/96 |
| 2010/0157208 | A1* | 6/2010 | Hanne | G02F 1/13363 349/96 |
| 2010/0231830 | A1* | 9/2010 | Hirakata | G02B 1/105 349/85 |
| 2013/0093968 | A1* | 4/2013 | Yanai | G02F 1/13363 349/15 |
| 2013/0235457 | A1* | 9/2013 | Matsuda | G02B 5/3016 359/485.01 |
| 2015/0226895 | A1* | 8/2015 | Hatanaka | G02B 5/305 359/487.02 |

FOREIGN PATENT DOCUMENTS

| | | |
|---|---|---|
| JP | 2008268339 A | 11/2008 |
| JP | 2010-31223 A | 2/2010 |
| JP | 2011150314 A | 8/2011 |
| JP | 2013-33248 A | 2/2013 |
| JP | 2013109090 A | 6/2013 |
| JP | 2014-123134 A | 7/2014 |
| JP | 2014145852 A | 8/2014 |
| JP | 5677204 B2 | 2/2015 |
| JP | 2015-206852 A | 11/2015 |
| JP | 2015-212823 A | 11/2015 |
| KR | 20140121446 A | 10/2014 |

OTHER PUBLICATIONS

Decision for Grant of Patent dated Nov. 14, 2017 in KR Application No. 10-2017-0022843.

\* cited by examiner

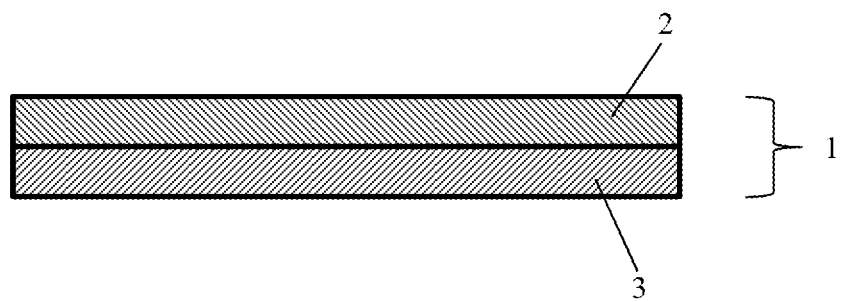

ELLIPTICALLY POLARIZING PLATE

CROSS-REFERENCE TO RELATED APPLICATION

This Non-provisional application claims priority under 35 U.S.C. § 119 to Japanese Patent Application Nos. 2016-051544, filed in Japan on Mar. 15, 2016, and 2016-247129, filed in Japan on Dec. 20, 2016, the entire contents of which are hereby incorporated by reference.

BACKGROUND OF THE INVENTION

Field of the Invention

The present invention relates to an elliptically polarizing plate and a display device including the elliptically polarizing plate.

Description of the Related Art

For flat panel display devices (FPDs) such as organic electroluminescent (EL) display devices, circularly polarizing plates have been employed widely in order to prevent reflection from external light. Circularly polarizing plates have a configuration in which a linearly polarizing plate and a retardation plate ($\lambda/4$ plate) are laminated. When a common normal wavelength dispersion material is used as a retardation plate, there is a problem that coloring of reflected colors occurs because a $\lambda/4$ retardation cannot be developed in the entire visible region. In order to solve this problem, JP-B-3325560 discloses a circularly polarizing plate in which a liquid crystal material having reverse wavelength dispersion designed such that a smaller birefringence is exhibited at short wavelengths is employed as a retardation plate and JP-A-2014-123134 discloses a circularly polarizing plate in which a polymer film material having reverse wavelength dispersion is employed as a retardation plate.

SUMMARY OF THE INVENTION

Theoretically, a circularly polarizing plate free from reflected colors can be formed by designing a retardation plate such that a ¼ retardation is produced at wavelengths in the entire visible region (in other words, establishing reverse wavelength dispersion). That is, a circularly polarizing plate free from reflected colors can be formed by adjusting the retardation Re(450) at 450 nm of approximately blue light to 450/4=112.5 nm, the retardation Re(550) at 550 nm of approximately green light to 550/4=137.5 nm, and the retardation Re(650) at 650 nm of approximately red light to 650/4=162.5 nm as theoretical values.

However, in retardation plates such as those disclosed in JP-B-3325560 and JP-A-2014-123134, the retardation can be brought closer to theoretical values for short wavelength light, but the retardation cannot be matched with theoretical values for long wavelength light. This is because the reverse wavelength dispersion birefringence as a substantial retardation plate is acquired by subtraction between the birefringence indexes at individual wavelengths of a positively aligned birefringence structure and a negatively aligned birefringence structure and the wavelength dispersion inherent to a material cannot change linearly. Directly, it is caused by an ultimate principle that a larger dispersion is exhibited at a shorter wavelength and a larger dispersion is exhibited at a longer wavelength. Due to this, when a retardation plate is designed such that green light, which affords the highest human eye sensitivity, may be a theoretical value, there is a possible problem that the antireflection for red light becomes insufficient and a red reflected color is produced.

Accordingly, it is an object of the present invention to provide an elliptically polarizing plate that suppresses coloring of reflected colors at wavelengths in the entire visible region and that can impart good display characteristics when used for a display device.

The present invention provides the following preferable embodiments [1] through [10].

[1] An elliptically polarizing plate comprising a polarizing plate and a retardation plate and satisfying the following formulae (1) through (4):

$$0.8 \leq P(450)/P(650) \leq 1.2 \tag{1}$$

$$P(550) \geq 0.7 \tag{2}$$

$$Re(450) < Re(550) < Re(650) \tag{3}$$

$$0.05 < 1 - P(450) < 0.3 \tag{4}$$

In formulae (1) through (4),

Re(450), Re(550) and Re(650) represent the front retardation at wavelengths ($\lambda$) of 450 nm, 550 nm and 650 nm, respectively, and P(450), P(550) and P(650) represent the elliptically polarized states (P($\lambda$)) with respect to light at wavelengths ($\lambda$) of 450 nm, 550 nm and 650 nm, respectively, where $P(\lambda) = \tan\{\sin^{-1}(I1(\lambda) \times \sin \Pi(\lambda) \times \sin 2\theta - I2(\lambda) \times \sin \Pi(\lambda) \times \cos 2\theta)/I2(\lambda))/2\}$, $I1(\lambda) = (10^{-A1(\lambda)} - 10^{-A2(\lambda)})/2$, $I2(\lambda) = (10^{-A1(\lambda)} + 10^{-A2(\lambda)})/2$, and $\Pi(\lambda) = Re(\lambda)/\lambda \times 2\pi$, wherein $A1(\lambda)$ represents the absorbance in the transmission axis direction of the polarizing plate at a wavelength of $\lambda$, $A2(\lambda)$ represents the absorbance in the absorption axis direction of the polarizing plate at a wavelength of $\lambda$, Re($\lambda$) represents the front retardation at a wavelength of $\lambda$, and $\theta$ represents the angle formed by the absorption axis of the polarizing plate and the slow axis of the retardation plate.

[2] The elliptically polarizing plate according to [1], wherein the front retardation of the retardation plate at a wavelength of 550 nm satisfies the following formula (5):

$$130 \text{ nm} \leq Re(550) \leq 150 \text{ nm} \tag{5}$$

wherein Re (550) represents the front retardation at a wavelength of 550 nm.]

[3] The elliptically polarizing plate according to [1] or [2], wherein the absorbance in the absorption axis direction (A2) of the polarizing plate at a wavelength of $\lambda$ satisfies the following formulae (6) through (8):

$$1 \leq A2(450) \leq 6 \tag{6}$$

$$1 \leq A2(550) \leq 6 \tag{7}$$

$$2 \leq A2(650) \leq 6 \tag{8}$$

[4] The elliptically polarizing plate according to any one of [1] to [3], wherein the absorbance in the transmission axis direction (A1) of the polarizing plate at a wavelength of $\lambda$ satisfies the following formulae (9) through (11):

$$0.001 \leq A1(450) \leq 0.1 \tag{9}$$

$$0.001 \leq A1(550) \leq 0.1 \tag{10}$$

$$0.002 \leq A1(650) \leq 0.2 \tag{11}$$

[5] The elliptically polarizing plate according to any one of [1] to [4], wherein the absorbance in the absorption axis direction (A2) of the polarizing plate at a wavelength of λ satisfies the following formulae (12) and (13):

$$A2(650) > A2(450) \quad (12)$$

$$A2(650) > A2(550) \quad (13).$$

[6] The elliptically polarizing plate according to any one of [1] to [5], wherein the angle formed by the absorption axis of the polarizing plate and the slow axis of the retardation plate is substantially 45°.

[7] The elliptically polarizing plate according to any one of [1] to [6], wherein the retardation plate is a layer formed of a polymer in the aligned state of a polymerizable liquid crystal compound.

[8] The elliptically polarizing plate according to any one of [1] to [7], wherein the polarizing plate comprises a polymer of a polymerizable liquid crystal compound in the aligned state of a mixture of the polymerizable liquid crystal compound and a dichroic dye.

[9] A liquid crystal display device comprising the elliptically polarizing plate according to any one of [1] to [8].

[10] An organic EL display device comprising the elliptically polarizing plate according to any one of [1] to [8].

According to the present invention, there can be provided an elliptically polarizing plate that suppresses coloring of reflected colors at wavelengths in the entire visible region and that can impart good display characteristics when used for a display device.

BRIEF DESCRIPTION OF THE DRAWINGS

FIG. 1 is a schematic diagram of an elliptically polarizing plate having a polarizing plate and a retardation plate.

DETAILED DESCRIPTION OF THE PREFERRED EMBODIMENTS

Embodiments of the present invention are described in detail below. The scope of the present invention is not limited to the embodiments described herein and various modifications may be made as long as the spirit of the present invention is not impaired.

The elliptically polarizing plate of the present invention comprises a polarizing plate and a retardation plate. The elliptically polarizing plate of the present invention satisfies the following formulae (1) through (4):

$$0.8 \leq P(450)/P(650) \leq 1.2 \quad (1)$$

$$P(550) \geq 0.7 \quad (2)$$

$$Re(450) < Re(550) < Re(650) \quad (3)$$

$$0.05 < 1 - P(450) < 0.3 \quad (4).$$

In the formulae (1) through (4),

Re(450), Re(550) and Re(650) represent the front retardation at wavelengths (λ) of 450 nm, 550 nm and 650 nm, respectively, and P(450), P(550) and P(650) represent the elliptically polarized states (P(λ)) with respect to light at wavelengths (λ) of 450 nm, 550 nm and 650 nm, respectively, where P(λ)=tan {sin$^{-1}$(I1(λ)×sin Π(λ)×sin 2θ−I2(λ)×sin Π(λ) ×cos 2θ)/I2 (λ))/2}, alternatively P(λ) also being represented as follows, $$P(\lambda) = \tan\left\{\frac{\sin^{-1}\left(\frac{I1(\lambda) \times \sin\Pi(\lambda) \times \sin 2\theta - I2(\lambda) \times \sin\Pi(\lambda) \times \cos 2\theta}{I2(\lambda)}\right)}{2}\right\}$$

$I1(\lambda) = (10^{-A1(\lambda)} - 10^{-A2(\lambda)})/2$, $I2(\lambda) = (10^{-A1(\lambda)} + 10^{-A2(\lambda)})/2$, and $\Pi(\lambda) = Re(\lambda)/\lambda \times 2\pi$ (unit:radian), wherein A1(λ) represents the absorbance in the transmission axis direction of the polarizing plate at a wavelength of λ, A2(λ) represents the absorbance in the absorption axis direction of the polarizing plate at a wavelength of λ, Re (λ) represents the front retardation at a wavelength of λ, and θ represents the angle formed by the absorption axis of the polarizing plate and the slow axis of the retardation plate.

Due to the satisfaction of the above formulae (1) to (4), such an elliptically polarizing plate can serve as an elliptically polarizing plate that can suppress light leakage of a red color, which is a problem with a conventional reverse wavelength dispersion retardation, and that can impart good display characteristics when being used for a display device.

In the formulae (1) and (2), P(λ) represents the elliptically polarized state at a wavelength of λ nm, P(450) represents the elliptically polarized light state with respect to light with a wavelength of 450 nm, P(550) represents the elliptically polarized light state with respect to light with a wavelength of 550 nm, and P(650) represents the elliptically polarized light state with respect to light with a wavelength of 650 nm. Here, A1(λ) is the absorbance in the transmission axis direction of the polarizing plate at a wavelength of λ, A2(λ) is the absorbance in the absorption axis direction of the polarizing plate at a wavelength of λ, and Π(λ) is the retardation (dimensionless value) of the retardation plate at a wavelength of λ and is calculated from the front retardation at a wavelength of λ, represented by Re (λ). As the value of P(λ) approaches 1, a more exactly circularly polarized state is formed.

The values of P(450)/P(650) represented by formula (1) represent the circularly polarized state at a wavelength of 450 nm and 650 nm, respectively; the closer to 1 the ratio is, the better the reflected color of the elliptically polarizing plate is suppressed, and a display with a good tint is attained when the elliptically polarizing plate is used for a display device. When the value of formula (1) is less than 0.8, reflected color tends to exhibit a bluish green color. When the value of formula (1) exceeds 1.2, reflected color tends to exhibit a red color. In the elliptically polarizing plate of the present invention, the value of P(450)/P(650) is preferably 0.85 or more, more preferably 0.9 or more, and preferably 1.15 or less, more preferably 1.1 or less, depending on the display device.

If the value of P(λ) is small, circular polarization conversion is insufficient and the antireflection characteristics on a display device deteriorate. In particular, when the value of P(550) at a wavelength of 550 nm, at which the eye sensitivity is the highest, it becomes difficult to sufficiently suppress light leakage due to reflection, and therefore, the elliptically polarizing plate of the present invention is required to satisfy the optical characteristics represented by the above formula (2). When the value of P(550) is less than 0.7, it becomes easy for a viewer to recognize light leakage. Therefore, in the present invention, the value of P(550) is preferably 0.75 or more, more preferably 0.8 or more. The upper limit of the value of P (550) is not particularly limited, it is usually 1 due to its defining formula. Moreover, in order to exhibit high antireflection characteristics when being used for a display device, the value of the P(λ) of the elliptically polarizing plate of the present invention is preferably 0.7 or more in the entire visible region. That is, it is preferred that both the value of P(450) at a wavelength on the short wavelength side of visible light and the value of P(650) at a wavelength on the long wavelength side of visible light are 0.7 or more.

The elliptically polarizing plate of the present invention satisfies the above formula (3) that represents reverse wavelength dispersion. The reverse wavelength dispersion is an optical characteristic in which the in-plane retardation value at a shorter wavelength is larger than the in-plane retardation value at a longer wavelength. The elliptically polarizing plate of the present invention preferably satisfies Re(450)/Re(550) ≤1, and more preferably satisfies 0.82≤Re(450)/Re(550)≤0.93.

From the viewpoint of optical design of the characteristic of reverse wavelength dispersion, the elliptically polarizing plate of the present invention is required to satisfy the optical characteristic represented by the above formula (4). The above formula (4) means being in an elliptically polarized state with respect to light at a wavelength of 450 nm, and it is possible to reduce the antireflection performance of a blue color by deviating the value of P(450) from 1, which is the theoretical value that represents a circularly polarized state, within a prescribed range. Particularly, display with a good tint is attained by adjusting the value of P(450)/P(650) in the above formula (1) to 0.8 to 1.2 in addition to satisfying the optical characteristic of formula (4). In the elliptically polarizing plate of the present invention, the value of 1−P(450) is preferably 0.08 or more, more preferably 0.1 or more, and preferably 0.26 or less, more preferably 0.24 or less, depending on the display device.

P(λ) can be arbitrarily adjusted by controlling the absorption selection characteristics of a polarizing plate or the wavelength dispersion and the thickness of a retardation plate. Specifically, in the case of an iodine-PVA polarizing plate, for example, the absorption selection characteristics of a polarizing plate can be controlled by the temperature and $I_2$ concentration/KI concentration during dyeing and the drying condition; absorption characteristics of red light are improved as compared with blue light if the KI concentration is increased. Higher drying temperatures will improve the absorption characteristics of blue light as compared with red light. In the case of a liquid crystal host-guest type polarizing plate, it is possible to control absorption selection characteristics by controlling the amount of addition or the ratio of a dichroic dye, which is a guest molecule. For example, when mixing a plurality of dyes, only the absorption characteristics of red light can be improved selectively by blending a blue dye more than other dyes. The wavelength dispersion of a retardation plate can be controlled by, for example, mixing a liquid crystal compound that exhibits reverse wavelength dispersion and a liquid crystal compound that exhibits normal dispersion in an arbitrary ratio. The retardation value decreases as the thickness of the retardation plate is reduced. While the retardation value can be controlled easily by controlling the thickness if the thickness is within a range where it can be controlled, the value of P(λ) can be controlled to a desired value easily, for example, by mixing a liquid crystal compound that exhibits normal wavelength dispersion and a liquid crystal compound that exhibits reverse wavelength dispersion such that desired wavelength dispersion may be exhibited and further adjusting the thickness of the retardation plate.

In the present invention, the antireflection characteristics of an elliptically polarizing plate that satisfy the above formulae (1) to (4) can be controlled by, for example, (i) making the front retardation value of a retardation plate larger than its theoretical value, (ii) deviating the wavelength dispersion of a retardation plate from its theoretical value, or (iii) making the absorbency near a wavelength of 650 nm (red light) of a polarizing plate larger than the absorbency at other wavelengths such as near a wavelength of 450 nm (blue light) or near a wavelength of 550 nm (green light). As to (i), since the front retardation value, for example, is a value to be determined by Δn(λ)×d (Δn: refractive index difference, d: the thickness of a retardation plate), it can be made larger by increasing the thickness when the composition of the liquid crystal compound or the like that constitutes the retardation plate is fixed.

From the viewpoints of thickness reduction and ease in arbitrarily controlling wavelength dispersion, it is preferred that the retardation plate that can constitute the elliptically polarizing plate of the present invention be a layer formed of a polymer in the aligned state of a polymerizable liquid crystal compound in which optical anisotropy is developed by applying and aligning the polymerizable liquid crystal compound (hereinafter also referred to as "optically an isotropic layer"). The polymerizable liquid crystal compound as referred to herein is a liquid crystal compound having a polymerizable functional group, especially, a photopolymerizable functional group. The photopolymerizable functional group refers to a group capable of participating in a polymerization reaction by the action of an activated radical, an acid, or the like generated from a photopolymerization initiator. Examples of the photopolymerizable functional group include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Especially, an acryloyloxy group, a methacryloyloxy group, a vinyloxy group, an oxiranyl group, and an oxetanyl group are preferred, and an acryloyloxy group is more preferred. While the liquid crystallinity may be either thermotropic liquid crystal or lyotropic liquid crystal, thermotropic liquid crystal is preferred in that it can be controlled in thickness precisely. The phase order structure in a thermotropic liquid crystal may be either nematic liquid crystal or smectic liquid crystal.

In the present invention, the structure of the following formula (I) is particularly preferred as the polymerizable liquid crystal compound in that it develops the reverse wavelength dispersion described above.

[Chemical Formula 1]

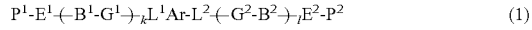

(1)

In formula (I), Ar represents a divalent aromatic group and at least one of a nitrogen atom, an oxygen atom, and a sulfur atom is contained in the divalent aromatic group.

$G^1$ and $G^2$ each independently represent a divalent aromatic group or a divalent alicyclic hydrocarbon group. Here, the hydrogen atoms contained in the divalent aromatic group or the divalent alicyclic hydrocarbon group each may have been substituted for a halogen atom, an alkyl group having 1 to 4 carbon atoms, a fluoroalkyl group having 1 to 4 carbon atoms, an alkoxy group having 1 to 4 carbon atoms, a cyano group, or a nitro group and the carbon atoms constituting the divalent aromatic group or the divalent alicyclic hydrocarbon group each may have been replaced by an oxygen atom, a sulfur atom, or a nitrogen atom.

$L^1$, $L^2$, $B^1$, and $B^2$ are each independently a single bond or a divalent linking group.

K and l each independently represent an integer of 0 to 3 and satisfy the relationship of $1 \leq k+l$. Here, when it is $2 \leq k+l$, $B^1$ and $B^2$, and $G^1$ and $G^2$ may be either the same or different from each other.

$E^1$ and $E^2$ each independently represent an alkanediyl group having 1 to 17 carbon atoms, wherein each hydrogen atom contained in the alkanediyl group may have been substituted for a halogen atom, and each —$CH_2$— obtained in the alkanediyl group may have been replaced by —O— or —Si—.

$P^1$ and $P^2$ each independently represent a polymerizable group or the hydrogen atom, and at least one of them is a polymerizable group.

Preferably, $G^1$ and $G^2$ each independently represent a 1,4-phenyl group that may have been substituted by at least one substituent selected from the group consisting of a halogen atom and an alkyl group having 1 to 4 carbon atoms, or a 1,4-cyclohexyl group that may have been substituted by at least one substituent selected from the group consisting of a halogen atom and an alkyl group having 1 to 4 carbon atoms, more preferably, they are a 1,4-phenyl group, an unsubstituted 1,4-phenyl group, or an unsubstituted 1,4-trans-cyclohexyl group, and particularly preferably, they are an unsubstituted 1,4-phenyl group or an unsubstituted 1,4-trans-cyclohexyl group.

Preferably, at least one of the plurality of $G^1$ and at least one of the plurality of $G^2$ are divalent alicyclic hydrocarbon groups, and more preferably, at least one of $G^1$ and $G^2$ attached to $L^1$ or $L^2$ is a divalent alicyclic hydrocarbon group.

Preferably, $L^1$ and $L^2$ are each independently a single bond, —O—, —$CH_2CH_2$—, —$CH_2O$—, —COO—, —OCO—, —N=N—, —$CR^a$=$CR^b$—, or —C≡C—. $R^a$ and $R^b$ each independently represent an alkyl group having 1 to 4 carbon atoms or a hydrogen atom. More preferably, $L^1$ and $L^2$ are each independently a single bond, —O—, —$CH_2CH_2$—, —COO—, or —OCO—.

$B^1$ and $B^2$ are preferably each independently a single bond, —O—, —S—, —$CH_2O$—, —COO—, or —OCO—, and more preferably a single bond, —O—, —COO—, or —OCO—.

From the viewpoint of the development of reverse wavelength dispersion, k and l are preferably within the range of $2 \leq k+l \leq 6$, and preferably $k+l=4$, and more preferably $k=2$ and $l=2$. It is preferred that $k=2$ and $l=2$ because this affords a symmetrical structure.

$E^1$ and $E^2$ preferably each independently are an alkanediyl group having 1 to 17 carbon atoms, more preferably an alkanediyl group having 4 to 12 carbon atoms.

Examples of the polymerizable group represented by $P^1$ or $P^2$ include an epoxy group, a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Especially, an acryloyloxy group, a methacryloyloxy group, a vinyloxy group, an oxiranyl group, and an oxetanyl group are preferred, and an acryloyloxy group is more preferred.

Preferably, Ar has an aromatic heterocyclic ring. Examples of the aromatic heterocyclic ring include a furan ring, a benzofuran ring, a pyrrole ring, a thiophene ring, a pyridine ring, a thiazole ring, a benzothiazole ring, a thienothiazole ring, an oxazole ring, a benzoxazole ring, and a phenanthroline ring. In particular, Ar preferably has a thiazole ring, a benzothiazole ring, or a benzofuran ring, and more preferably, Ar has a benzothiazole group. When a nitrogen atom is contained in Ar, the nitrogen atom preferably has a π electron.

The total number $N_\pi$ of the π electrons contained in a divalent aromatic ring represented by Ar in formula (I) is preferably 10 or more, more preferably 14 or more, even more preferably 18 or more. $N_\pi$ is preferably 30 or less, more preferably 26 or less, even more preferably 24 or less.

Examples of the aromatic group represented by Ar include the following groups.

[Chemical Formula 2]

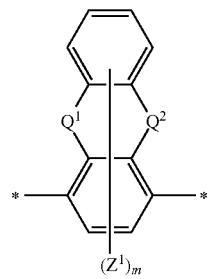

(Ar-1)

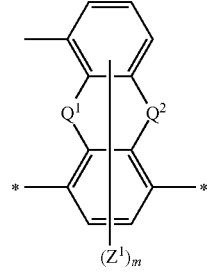

(Ar-2)

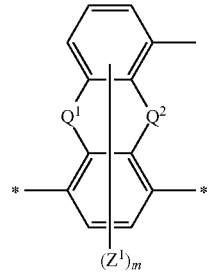

(Ar-3)

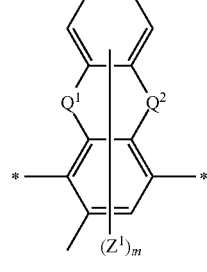

(Ar-4)

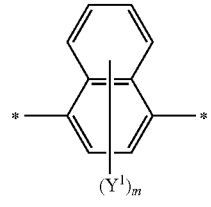

(Ar-5)

-continued
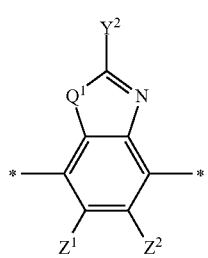
(Ar-6)
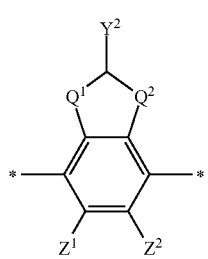
(Ar-7)
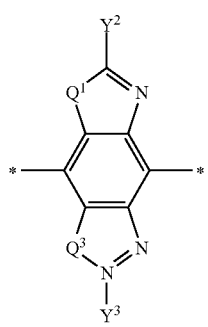
(Ar-8)
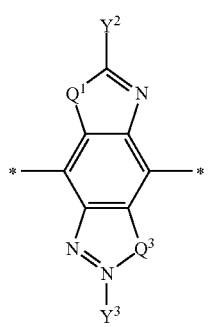
(Ar-9)
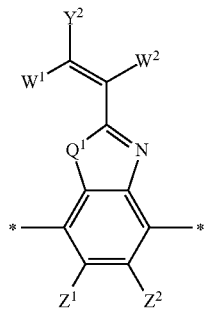
(Ar-10)
-continued
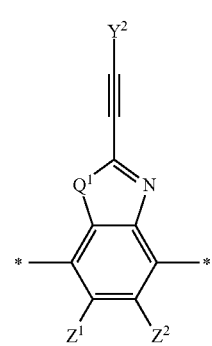
(Ar-11)
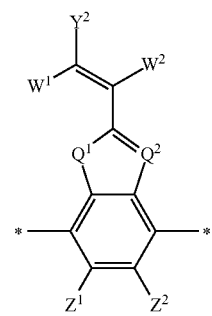
(Ar-12)
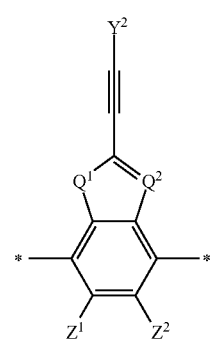
(Ar-13)
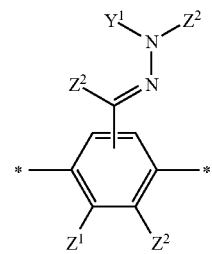
(Ar-14)
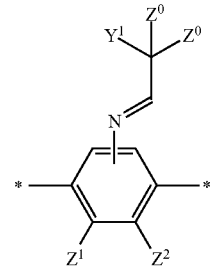
(Ar-15)

-continued (Ar-16)
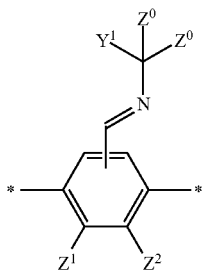

(Ar-17)
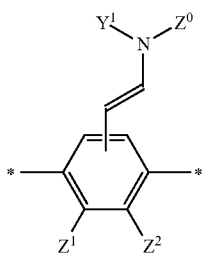

(Ar-18)
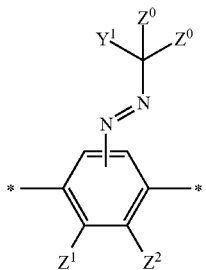

(Ar-19)
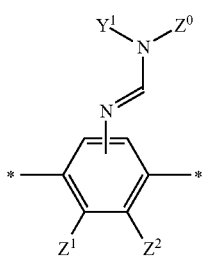

(Ar-20)
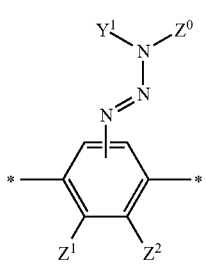

In formula (Ar-1) through formula (Ar-20), the symbol each * represents a linking site, and $Z^0$, $Z^1$ and $Z^2$ each independently represent a hydrogen atom, a halogen atom, an alkyl group having 1 to 12 carbon atoms, a cyano group, a nitro group, an alkylsulfinyl group having 1 to 12 carbon atoms, an alkylsulfonyl group having 1 to 12 carbon atoms, a carboxyl group, a fluoroalkyl group having 1 to 12 carbon atoms, an alkoxy group having 1 to 6 carbon atoms, an alkylthio group having 1 to 12 carbon atoms, an N-alkylamino group having 1 to 12 carbon atoms, an N,N-dialkylamino group having 2 to 12 carbon atoms, an N-alkylsulfamoyl group having 1 to 12 carbon atoms, or an N,N-dialkylsulfamoyl group having 2 to 12 carbon atoms.

$Q^1$, $Q^2$, and $Q^3$ each independently represent —$CR^{2'}R^{3'}$—, —S—, —NH—, —$NR^{2'}$—, —CO—, or —O—, and $R^{2'}$ and $R^{3'}$ each independently represent a hydrogen atom or an alkyl group having 1 to 4 carbon atoms.

$Y^1$, $Y^2$ and $Y^3$ each independently represent an optionally substituted aromatic hydrocarbon group or an optionally substituted aromatic heterocyclic group.

$W^1$ and $W^2$ each independently represent a hydrogen atom, a cyano group, a methyl group, or a halogen atom, and m represents an integer of 0 to 6.

Examples of the aromatic hydrocarbon group in each of $Y^1$, $Y^2$, and $Y^3$ include aromatic hydrocarbon groups having 6 to 20 carbon atoms, such as a phenyl group, a naphthyl group, an anthryl group, a phenanthryl group, and a biphenyl group; a phenyl group and a naphthyl group are preferred, and a phenyl group is more preferred. Examples of the aromatic heterocyclic group include aromatic heterocyclic groups having 4 to 20 carbon atoms containing at least one hetero atom such as nitrogen atom, oxygen atom and sulfur atom, such as a furyl group, a pyrrolyl group, a thienyl group, a pyridinyl group, a thiazolyl group, and a benzothiazolyl group, and a furyl group, a thienyl group, a pyridinyl group, a thiazolyl group, and a benzothiazolyl group are preferred.

$Y^1$, $Y^2$ and $Y^3$ each independently may be an optionally substituted polycyclic aromatic hydrocarbon group or an optionally substituted polycyclic aromatic heterocyclic group. A polycyclic aromatic hydrocarbon group refers to a condensed polycyclic aromatic hydrocarbon group or a group derived from an aromatic ring assembly. The polycyclic aromatic heterocyclic group refers to a condensed polycyclic aromatic heterocyclic group or a group derived from an aromatic ring assembly.

Preferably, $Z^0$, $Z^1$ and $Z^2$ are each independently a hydrogen atom, a halogen atom, an alkyl group having 1 to 6 carbon atoms, a cyano group, a nitro group, or an alkoxy group having 1 to 12 carbon atoms; $Z^0$ is more preferably a hydrogen atom, an alkyl group having 1 to 12 carbon atoms, or a cyano group, and $Z^1$ and $Z^2$ are each more preferably a hydrogen atom, a fluorine atom, a chlorine atom, a methyl group, or a cyano group.

$Q^1$, $Q^2$, and $Q^3$ are each preferably —NH—, —S—, —$NR_2'$—, or —O—, and $R^{2'}$ is preferably a hydrogen atom. Especially, —S—, —O— and —NH— are particularly preferred.

Of formulae (Ar-1) through (Ar-20), formulae (Ar-6) and formula (Ar-7) are preferable from the viewpoint of the stability of a molecule. In formulae (Ar-14) to (Ar-20), $Y^1$ may form an aromatic heterocyclic group together with $Z^0$ and the nitrogen atom to which $Y^1$ is attached. Examples thereof include a pyrrole ring, an imidazole ring, a pyrroline ring, a pyridine ring, a pyrazine ring, a pyrimidine ring, an indole ring, a quinoline ring, an isoquinoline ring, a purine ring, and a pyrrolidine ring. The aromatic heterocyclic group may have a substituent. $Y^1$ may be the optionally substituted polycyclic aromatic hydrocarbon group or polycyclic aromatic heterocyclic group described previously together with $Z^0$ and the nitrogen atom to which $Y^1$ is attached.

A retardation plate having reverse wavelength dispersion can be produced by aligning such a polymerizable liquid crystal compound to form a polymer in the aligned state of the polymerizable liquid crystal compound. In this case, the polymerizable liquid crystal compound may be used alone or alternatively two or more polymerizable liquid crystal compounds differing in molecular structure may be used in combination. In the present invention, it is preferred to mix two or more polymerizable liquid crystal compounds differing in wavelength dispersion because this can facilitate wavelength dispersion to be controlled in conformity with the polarizing plate that constitutes the elliptically polarizing plate or the display device into which the elliptically polarizing plate is mounted. In this case, it is preferred that the polymerizable liquid crystal compound represented by the formula (I) be contained as a polymerizable liquid crystal compound to be mixed.

In one embodiment of the present invention, it is preferred that the retardation plate to constitute the elliptically polarizing plate of the present invention further contain, in addition to the polymerizable liquid crystal compound represented by the formula (I), another polymerizable liquid crystal compound having wavelength dispersion different from that of the polymerizable liquid crystal compound of formula (I). The other polymerizable liquid crystal compound different from the polymerizable liquid crystal compound represented by the formula (I) may be either a polymerizable liquid crystal compound that exhibits reverse wavelength dispersion and that has a molecular structure different from that of the polymerizable liquid crystal compound represented by the formula (I) or a polymerizable liquid crystal compound that exhibits normal wavelength dispersion. In a preferred embodiment of the present invention, the retardation plate that constitutes the elliptically polarizing plate of the present invention contains a polymerizable liquid crystal compound having normal wavelength dispersion in addition to the polymerizable liquid crystal compound represented by the formula (I). This makes it possible to control the wavelength dispersion of a retardation plate more easily.

In the present invention, when a polymerizable liquid crystal compound that exhibits normal wavelength dispersion is contained as a liquid crystal compound that constitutes a retardation plate, the structure thereof is not particularly limited and a polymerizable liquid crystal compound that exhibits normal wavelength dispersion commonly used in this field can be used. As such a polymerizable liquid crystal compound, the structure represented by the following formula (II) is preferred, for example.

[Chemical Formula 3]

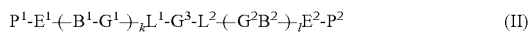

$$P^1-E^1-(-B^1-G^1-)_k L^1-G^3-L^2-(-G^2 B^2-)_l E^2-P^2 \quad (II)$$

In formula (II), $G^1$, $G^2$, $L^1$, $L^2$, $B^1$, $B^2$, $k$, $l$, $E^1$, $E^2$, $P^1$ and $P^2$ are as defined for the above structural formula (I), and $G^3$ is independently defined as $G^1$ and $G^2$.

In formula (II), k and l are preferably within the range of $1 \leq k+l \leq 6$, more preferably within the range of $1 \leq k+l \leq 4$, and a structure satisfying $k+l=2$ is even more preferred.

Specific examples of a polymerizable liquid crystal compound that exhibits normal wavelength dispersion include compounds having a polymerizable group of the compounds disclosed in "3.8.6 Network (Completely Crosslinked Type)" and "6.5.1 Liquid Crystal Material, b. Polymerizable Nematic Liquid Crystal Material" in "Liquid Crystal Handbook" (edited by Liquid Crystal Handbook Editorial Committee, and published by Maruzen Publishing Co., Ltd. on Oct. 30, 2000). Commercially available products may be used such polymerizable liquid crystal compounds.

In the present invention, it is possible to impart the optical characteristics satisfying the above formulae (1) to (4) to an elliptically polarizing plate by making the retardation value of a retardation plate larger than the theoretical value and by deviating the wavelength dispersion of the retardation plate from the theoretical value as described above. In the present invention, "to deviate the wavelength dispersion of a retardation plate from a theoretical value" means $R(\lambda 1)/R(\lambda 2) \approx \lambda 1/\lambda 2$ ($\lambda 1 < \lambda 2$). The wavelength dispersion of a retardation plate can be adjusted by the mixing ratio of a polymerizable liquid crystal compound having reverse wavelength dispersion to a polymerizable liquid crystal compound having normal wavelength dispersion. The higher the proportion of the polymerizable liquid crystal compound having normal wavelength dispersion, the more $R(\lambda 1)/R(\lambda 2) > \lambda 1/\lambda 2$ ($\lambda 1 < \lambda 2$). Herein, $R(\lambda 1)$ represents a front retardation value at a wavelength of $\lambda 1$ and $R(\lambda 2)$ represents a front retardation value at a wavelength of $\lambda 2$. The retardation value of a retardation plate becomes large as the proportion of the polymerizable liquid crystal compound having normal wavelength dispersion increases. Therefore, when a retardation plate is constituted, for example, by mixing two or more polymerizable liquid crystal compounds including the polymerizable liquid crystal compound represented by the above formula (I) in the present invention, the mixing ratio of the compounds can be determined appropriately depending on the molecular structure of the polymerizable liquid crystal compound represented by formula (I) and the types of the polymerizable liquid crystal compounds to be combined, but the ratio of the polymerizable liquid crystal compound represented by formula (I) relative to the total amount of all the polymerizable liquid crystal compounds that constitute the retardation plate is preferably 50% by mass or more, more preferably 60% by mass or more.

In a particularly preferred embodiment of the elliptically polarizing plate of the present invention, the retardation plate constituting the elliptically polarizing plate contains the polymerizable liquid crystal compound represented by the above formula (I) and the polymerizable liquid crystal compound represented by the above formula (II) preferably in a mixing ratio of 100:0 to 50:50, more preferably 100:0 to 75:25.

In one embodiment of the present invention, the front retardation in the wavelength of 550 nm of a retardation plate preferably satisfies the following formula (5):

$$130 \text{ nm} \leq Re(550) \leq 150 \text{ nm} \quad (5).$$

When the front retardation of the retardation plate at a wavelength of 550 nm satisfies the above formula (5), the retardation plate functions as a so-called ¼ wavelength plate. In particular, it is preferred to combine a polarizing plate having good absorption selection characteristics with a retardation plate satisfying the above formula (5). Such combination can afford a circularly polarizing plate having good antireflection characteristics. When combining a polarizing plate and a retardation plate, it is preferred that their optic axes form an angle of substantially 45°.

When producing a polymer in the aligned state of a polymerizable liquid crystal compound, the polymer in the aligned state of a polymerizable liquid crystal compound can be produced by applying a composition containing the polymerizable liquid crystal compound optionally diluted with a solvent (hereinafter sometimes referred to as "composition for forming an optically anisotropic layer") to a substrate or an orientation film formed on the substrate, and performing polymerization after optionally drying the solvent.

By polymerizing a polymerizable liquid crystal compound while it maintains its aligned state, it is possible to produce a liquid crystal cured film that maintains the aligned state, and the liquid crystal cured film constitutes a retardation plate.

From the viewpoint of improving the alignment property of a polymerizable liquid crystal compound, the content of the polymerizable liquid crystal compound in the composition for forming an optically anisotropic layer (when a plurality of polymerizable liquid crystal compounds are contained, the total amount thereof) is usually 70 to 99.9 parts by mass, preferably 80 to 99 parts by mass, more preferably 85 to 97 parts by mass, even more preferably 85 to 95 parts by mass, relative to 100 parts by mass of the solid content of the composition for forming an optically anisotropic layer. The solid content as referred to herein means the total amount of the ingredients of the composition for forming an optically an isotropic layer excluding a solvent.

The composition for forming an optically anisotropic layer may contain such components known in the art as a solvent, a polymerization initiator, a polymerization inhibitor, a photosensitizer, and a leveling agent, in addition to the polymerizable liquid crystal compound.

Preferred as the solvent is an organic solvent that can dissolve the constituents of the composition for forming an optically anisotropic layer, such as a polymerizable liquid crystal compound, and more preferred is a solvent that can dissolve the components of the composition for forming an optically anisotropic layer, such as a polymerizable liquid crystal compound, and that is inert to a polymerization reaction of the polymerizable liquid crystal compound. Specific examples thereof include water; alcohol solvents, such as methanol, ethanol, ethylene glycol, isopropanol, propylene glycol, methyl cellosolve, butylcellosolve, propylene glycol monomethyl ether, and phenol; ester solvents, such as ethyl acetate, butyl acetate, ethylene glycol methyl ether acetate, γ-butyrolactone, propylene glycol methyl ether acetate, and ethyl lactate; ketone solvents, such as acetone, methyl ethyl ketone, cyclopentanone, cyclohexanone, methyl amyl ketone, and methyl isobutyl ketone; non-chlorinated aliphatic hydrocarbon solvents, such as pentane, hexane and heptane; non-chlorinated aromatic hydrocarbon solvents, such as toluene, and xylene; nitrile solvents, such as acetonitrile; ether solvents, such as tetrahydrofuran and dimethoxyethane; and chlorinated hydrocarbon solvents, such as chloroform and chlorobenzene. Two or more organic solvents may be used in combination. Especially, alcohol solvents, ester solvents, ketone solvents, non-chlorinated aliphatic hydrocarbon solvents, and non-chlorinated aromatic hydrocarbon solvents are preferred.

The content of a solvent is preferably 10 to 10000 parts by mass, more preferably 100 to 5000 parts by mass, even more preferably 100 to 2000 parts by mass, relative to 100 parts by mass of the solid of a composition for the formation of an optically anisotropic layer. The solid concentration in the composition for the formation of an optically anisotropic layer is preferably 2 to 50% by mass, more preferably 5 to 50% by mass, even more preferably 5 to 30% by mass.

The polymerization initiator is a compound capable of initiating a polymerization reaction, such as a polymerizable liquid crystal. As the polymerization initiator, photopolymerization initiators, which generate radicals on exposure to light, are preferred. Examples of the photopolymerization initiator include benzoin compounds, benzophenone compounds, benzyl ketal compounds, α-hydroxyketone compounds, α-aminoketone compounds, α-acetophenone compounds, triazine compounds, iodonium salts, and sulfonium salts. Specific examples thereof include Irgacure (registered trademark) 907, Irgacure 184, Irgacure 651, Irgacure 819, Irgacure 250, and Irgacure 369 (all produced by Ciba Japan K.K.); Seikuol (registered trademark) BZ, Seikuol Z, and Seikuol BEE (all produced by Seiko Chemical Co., Ltd.); Kayacure (registered trademark) BP100 (produced by Nippon Kayaku Co., Ltd.); Kayacure UVI-6992 (produced by The Dow Chemical Company); Adeka Optomer (registered trademark) SP-152 and Adeka Optomer SP-170 (all produced by Adeka Corporation); TAZ-A and TAZ-PP (all produced by Nihon Siber Hegner K.K.), and TAZ-104 (produced by Sanwa Chemical Co., Ltd.). Of these, preferred are α-acetophenone compounds, and examples of α-acetophenone compounds include
2-methyl-2-morpholino-1-(4-methylsulfanylphenyl)propan-1-one, e,
2-dimethylamino-1-(4-morpholinophenyl)-2-benzylbutan-1-one, and
2-dimethylamino-1-(4-morpholinophenyl)-2-(4-methylphenylmethyl) butan-1-one, and more preferred are
2-methyl-2-morpholino-1-(4-methylsulfanylphenyl)propan-1-one and
2-dimethylamino-1-(4-morpholinophenyl)-2-benzylbutan-1-one. Commercially available products of α-acetophenone compounds include Irgacure 369, 379EG and 907 (all produced by BASF Japan Ltd.) and Seikuol BEE (produced by Seiko Chemical Co., Ltd.).

The maximum absorption wavelength of the photopolymerization initiator is preferably 300 nm to 380 nm, more preferably 300 nm to 360 nm because the energy emitted from a light source can be sufficiently utilized and the productivity is satisfactory.

In order to polymerize the polymerizable liquid crystal compound without disturbing the alignment of the polymerizable liquid crystal compound, the content of the polymerization initiator is generally 0.1 to 30 parts by mass, preferably 0.5 to 10 parts by mass, relative to 100 parts by mass of the polymerizable liquid crystal compound.

The polymerization reaction of a polymerizable liquid crystal compound can be controlled by incorporating a polymerization inhibitor. Examples of the polymerization inhibitor include hydroquinone and hydroquinones having a substituent such as an alkyl ether; catechols having a substituent such as an alkyl ether, such as butylcatechol; a radical scavenger such as pyrogallols, 2,2,6,6-tetramethyl-1-piperidinyloxy radical; thiophenols; β-naphthylamines, and β-naphthols.

In order to polymerize the polymerizable liquid crystal compound without disturbing the alignment of the polymerizable liquid crystal compound, the content of the polymerization inhibitor is generally 0.1 to 30 parts by mass, preferably 0.5 to 10 parts by mass, relative to 100 parts by mass of the polymerizable liquid crystal compound.

Examples of the photosensitizer include xanthones such as xanthone and thioxanthone; anthracene and anthracenes having a substituent such as alkyl ether; phenothiazine; and rubrene.

By using the photosensitizer, it is possible to make the photopolymerization initiator highly sensitive. The content of the photosensitizer is generally 0.1 to 30 parts by mass, preferably 0.5 to 10 parts by mass, relative to 100 parts by mass of the polymerizable liquid crystal compound.

Examples of the leveling agent include organically modified silicone oil-based leveling agents, polyacrylate-based leveling agents, and perfluoroalkyl-based leveling agents. Specific examples thereof include DC3PA, SH7PA, DC11PA, SH28PA, SH29PA, SH30PA, ST80PA, ST86PA, SH8400, SH8700, and FZ2123 (all produced by Dow Corning Toray Co., Ltd.); KP321, KP323, KP324, KP326, KP340, KP341, X22-161A, and KF6001 (all produced by Shin-Etsu Chemical Co., Ltd.); TSF400, TSF401, TSF410, TSF4300, TSF4440, TSF4445, TSF-4446, TSF4452, and TSF4460 (all produced by Momentive Performance Materials Japan LLC); Fluorinert (registered trademark) FC-72, FC-40, FC-43, and FC-3283 (all produced by Sumitomo 3M Limited); Megaface (registered trademark) R-08, R-30, R-90, F-410, F-411, F-443, F-445, F-470, F-477, F-479, F-482, and F-483 (all produced by DIC Corporation); EFTOP (product name) EF301, EF303, EF351, and EF352 (all produced by Mitsubishi Materials Electronic Chemicals Co., Ltd.); Surflon (registered trademark) S-381, S-382, S-383, S-393, SC-101, SC-105, KH-40, and SA-100 (all produced by AGC SEIMI CHEMICAL CO., LTD.); Product names E1830 and E5844 (produced by Daikin Fine Chemical Laboratory, Co., Ltd.); and BM-1000, BM-1100, BYK-352, BYK-353, and BYK-361N (all product names, produced by BM Chemie). Two or more leveling agents may be combined.

By using the leveling agent, it is possible to form a smoother optically anisotropic layer.

In addition, in the course of the production of a retardation plate, it is possible to control the flowability of the composition for the formation of an optically anisotropic layer or to adjust the crosslinking density of the retardation plate. The content of the leveling agent is generally 0.1 to 30 parts by mass, preferably 0.1 to 10 parts by mass, relative to 100 parts by mass of the polymerizable liquid crystal compound.

<Application of Composition for Forming Optically Anisotropic Layer>

When producing a polymer in an aligned state of a polymerizable liquid crystal compound, a composition for forming an optically anisotropic layer is applied onto a substrate or an orientation film formed on a substrate, and the substrate is preferably a resin substrate. The resin substrate is usually a transparent resin substrate. The transparent resin substrate refers to a substrate having translucency in which light, especially, visible light can be transmitted, and the translucency refers to a property in which a transmission of light beams having wavelength ranging from 380 to 780 nm is 80% or higher. As the resin substrate, a film-shaped substrate is usually used, and an elongated film roll is preferably used.

Examples of the resin to constitute the substrate include polyolefins such as polyethylene, polypropylene, and norbornene-based polymers; polyvinyl alcohol; polyethylene terephthalate; polymethacrylic acid esters; polyacrylic acid esters; cellulosic esters; polyethylene naphthalate; polycarbonates; polysulfones; polyethersulfones; polyetherketones; polyphenylene sulfide; and polyphenylene oxide. Especially, a substrate made of a polyolefin such as polyethylene, polypropylene, and norbornene-based polymers, is preferable.

The thickness of the substrate is usually 5 to 300 μm, preferably 20 to 200 μm. A further thickness reduction effect is acquired by transferring only a polymer in an aligned state of a polymerizable liquid crystal compound by peeling the substrate.

An orientation film may have been formed on a surface of the substrate to which surface the composition for the formation of an optically anisotropic film is to be applied. The orientation film is a film having an alignment controlling force which aligns the polymerizable liquid crystal compound described below in a desired direction.

The orientation film preferably has solvent resistance as high as the film is not dissolved by the application of a composition for the formation of an optically anisotropic layer, and has heat resistance in heat treatment for removing solvents or for aligning a polymerizable liquid crystal compound described below. Examples of the orientation film include an orientation film comprising an aligned polymer, a photo-orientation film, a groove orientation film having an indented pattern or multiple grooves on its surface.

Such an orientation film makes the alignment of a polymerizable liquid crystal compound easy. It is possible to control various alignments such as horizontal alignment, vertical alignment, hybrid alignment, and inclined alignment, depending on the type of the orientation film and rubbing conditions. The value of the front retardation can be controlled by horizontally aligning a rod-shaped liquid crystal compound, or by vertically aligning a disk-like liquid crystal compound.

The thickness of the orientation film is usually within the range of 10 to 10000 nm, preferably within the range of 10 to 1000 nm, and more preferably within the range of 50 to 200 nm.

In the case of containing an aligned polymer, examples of the aligned polymer include polyamides and gelatins having amide linkages, polyimides having imide linkages and polyamic acids which are hydrolysates of polyimides, polyvinyl alcohol, alkyl-modified polyvinyl alcohols, polyacrylamide, polyoxazoles, polyethyleneimine, polystyrene, polyvinylpyrrolidone, polyacrylic acid, and polyacrylic acid esters. Especially, polyvinyl alcohol is preferable. Two or more aligned polymers may be combined.

An orientation film containing an aligned polymer is usually formed by applying an aligned polymer composition in which an aligned polymer is dissolved in a solvent to a substrate and then removing the solvent to form a coating film, or by applying an aligned polymer composition to a substrate, then removing the solvent to form a coating film, and then rubbing the coating film.

The concentration of the aligned polymer in the aligned polymer composition should just be in such a range that the aligned polymer completely dissolves in the solvent. The content of the aligned polymer in the aligned polymer composition is preferably 0.1 to 20% by mass, more preferably 0.1 to 10% by mass.

The aligned polymer composition is available in the market. Examples of a commercially available product of the aligned polymer composition include SUNEVER (registered trademark, produced by NISSAN CHEMICAL INDUSTRIES, LTD.) and OPTMER (registered trademark, produced by JSR Corporation).

The method of applying the aligned polymer composition to a substrate may be the same or similar method as the method of applying a composition for forming an optically anisotropic layer described below. Examples of the method of removing the solvent contained in the aligned polymer composition include air drying, draught drying, heat drying, and reduced pressure drying.

The coating film formed from the aligned polymer composition may be subjected to rubbing treatment. By performing the rubbing treatment, a restrictive force on alignment can be imparted to the coating film.

The method of the rubbing treatment may be, for example, a method involving bringing the coating film into contact with a rotating rubbing roll on which a rubbing cloth is wound. If masking is applied when performing the rubbing treatment, a plurality of areas (patterns) differing in the direction of alignment can be formed in the alignment layer.

The photo-orientation film is formed usually by applying a composition for forming a photo-orientation film containing a polymer or monomer has a photoreactive group to a substrate, then removing the solvent, and then applying polarized light (preferably, polarized UV). The direction of the restrictive force on alignment of the photo-orientation film can be controlled arbitrarily by choosing the polarization direction of the polarized light to be applied.

The photoreactive group refers to a group that generates an aligning ability upon irradiation with light. Specific examples thereof include a group that participates in a photoreaction serving as an origin of the aligning ability, such as an alignment-induced reaction, isomerization reaction, photodimerization reaction, photo-crosslinking reaction, or photodecomposition reaction of a molecule generated by irradiation with light. The photoreactive group is preferably a group having an unsaturated group, especially a double bond, and particularly preferably a group having at least one selected from the group consisting of a carbon-carbon double bond (C=C bond), a carbon-nitrogen double bond (C=N bond), a nitrogen-nitrogen double bond (N=N bond) and a carbon-oxygen double bond (C=O bond).

Examples of the photoreactive group having a C=C bond include a vinyl group, a polyene group, a stilbene group, a stilbazole group, a stilbazolium group, a chalcone group, and a cinnamoyl group. Examples of the photoreactive group having a C=N group include a group having a structure of a Schiff base, an aromatic hydrazone, or the like. Examples of the photoreactive group having an N=N bond include an azobenzene group, an azonaphthalene group, an aromatic heterocyclic azo group, an azobis group, formazan group, and a group having an azoxybenzene structure. Examples of the photoreactive group having a C=O bond include a benzophenone group, a coumarin group, an anthraquinone group, and a maleimide group. These groups may have a substituent such as an alkyl group, an alkoxy group, an aryl group, an allyloxy group, a cyano group, an alkoxycarbonyl group, a hydroxyl group, a sulfonic acid group, or a halogenated alkyl group.

A group that participates in a photodimerization reaction or a photocrosslinking reaction is preferable because of its superior alignment property. Especially, a group that participates in a photodimerization reaction is preferable, and a cinnamoyl group and a chalcone group are preferable in that an applied amount of a polarized light required for alignment is relatively small and a photo-orientation film superior in thermal stability and stability with time is obtained easily. The polymer having a photoreactive group particularly preferably is such a polymer having a cinnamoyl group that a terminal part of a side chain of the polymer has a cinnamic acid structure.

The content of the polymer or monomer having a photoreactive group in the composition for forming a photo-orientation film can be adjusted depending on the type or purpose of the polymer or monomer and the thickness of the photo-orientation film, and the content is preferably adjusted to at least 0.2% by mass or more, and more preferably is within the range of 0.3 to 10% by mass. The composition for forming a photo-orientation film may contain a polymeric material such as polyvinyl alcohol and polyimide, or a photosensitizer as long as the characteristics of the photo-orientation film are not impaired significantly The method of applying the composition for forming a photo-orientation film to a substrate may be the same or similar method as the method of applying a composition for forming an optically anisotropic layer described below. The method of removing the solvent from the applied composition for forming a photo-orientation film may be the same method as the method of removing a solvent from an aligned polymer composition.

In applying polarized light, there may be used either a mode of applying polarized light directly to a material prepared by removing the solvent from the composition for forming a photo-orientation film applied to the substrate or a mode of applying polarized light from the substrate side to apply the polarized light through the substrate. Preferably, the polarized light is substantially parallel light. The wavelength of the polarized light to be applied is within a wavelength range where the photoreactive group of the polymer or monomer having the photoreactive group can absorb light energy. Specifically, UV (ultraviolet ray) having a wavelength within a range of 250 nm to 400 nm is particularly preferable. Examples of the light source for applying the polarized light include a xenon lamp, a high pressure mercury lamp, an ultra-high pressure mercury lamp, a metal halide lamp, and an ultraviolet laser, such as KrF and ArF. Especially, a high-pressure mercury lamp, an ultrahigh pressure mercury lamp, and a metal halide lamp are preferable because they exhibit a high emission intensity of an ultraviolet ray having a wavelength of 313 nm. A polarized UV can be applied by applying light emitted from the light source through an appropriate polarization layer. Examples of the polarization layer include a polarization filter, a polarization prism, such as a Glan-Thompson prism and a Glan-Taylor prism, and a wire grid type polarization layer.

<Application of Composition for Forming Optically Anisotropic Layer>

The composition for forming an optically anisotropic layer is applied onto the substrate or the orientation film.

Examples of the method of applying the composition for forming an optically anisotropic layer on the substrate include an extrusion coating method, a direct gravure coating method, a reverse gravure coating method, a CAP coating method, a slit coating method, and a die coating method. Further examples include methods of applying the composition by use of a coater, such as a dip coater, a bar coater, and a spin coater. Especially, a CAP coating method, an inkjet method, a dip coating method, a slit coating method, a die coating method, and an application method using a bar coater are preferable in that it is possible to apply the composition continuously in the Roll-to-Roll mode. In application in the Roll-to-Roll mode, it is also possible to form an orientation film by applying the composition for forming an optically anisotropic layer to the substrate and further continuously applying the composition for forming an optically anisotropic film to the resulting orientation film.

<Drying of Composition for Forming Optically Anisotropic Layer>

Examples of the drying method of removing the solvent contained in the composition for forming an optically anisotropic layer include air drying, draught drying, heat drying, reduced pressure drying, and a combined method thereof. Especially, air drying and heat drying are preferable. The drying temperature is preferably within the range of 0 to 250° C., more preferably within the range of 50 to 220° C., even more preferably within the range of 60 to 170° C. The drying time is preferably 10 seconds to 20 minutes, more preferably 30 seconds to 10 minutes. Likewise, the composition for forming a photo-orientation film and an aligned polymer composition can be dried.

≤Polymerization of Polymerizable Liquid Crystal Compound>

In the present invention, photo polymerization is preferable as the method of polymerizing a polymerizable liquid crystal compound. Photo polymerization is performed by applying active energy rays to a stack in which a composition for forming an optically anisotropic layer containing a polymerizable liquid crystal compound has been applied onto a substrate or an orientation film. The active energy rays to be applied are chosen depending on the type of a polymerizable liquid crystal compound contained in a dry coating film (especially, the type of a photopolymerizable functional group which the polymerizable liquid crystal compound has), the type of a photopolymerization initiator when the photopolymerization initiator is contained, and the amounts thereof. Specific examples thereof include at least one type of light selected from the group consisting of visible light, ultraviolet light, infrared light, X-rays, α rays, β rays, and γ rays. Especially, ultraviolet light is preferable in that it can control the advance of polymerization reaction easily and a photopolymerization apparatus widely used in the present technical field can be use, and it is preferred that the type of the polymerizable liquid crystal compound is chosen such that the compound can be photopolymerized by ultraviolet light.

When the composition for forming an optically anisotropic layer contains a photopolymerization initiator, it is preferred to choose the type of the photopolymerization initiator such that the composition can be photopolymerized by ultraviolet light.

Examples of a light of the active energy rays include a low pressure mercury lamp, a medium pressure mercury lamp, A high pressure mercury lamp, an ultrahigh pressure mercury lamp, a xenon lamp, a halogen lamp, a carbon arc lamp, a tungsten lamp, a gallium lamp, an excimer laser, an LED light source that emits light having a wavelength within the range of 380 to 440 nm, a chemical lamp, a black light lamp, a microwave-excited mercury lamp, and a metal halide lamp.

The time for which light is applied is usually 0.1 seconds to 10 minutes, preferably 0.1 seconds to 1 minute, more preferably 0.1 seconds to 30 seconds, and even more preferably 0.1 seconds to 10 seconds. If within the above range, an optically anisotropic layer with higher transparency can be obtained.

In the present invention, the retardation value of a retardation plate can be controlled by adjusting the thickness of the retardation plate. If a retardation plate is fixed in its composition, its retardation value increases as the thickness of the plate is increased. When an elliptically polarizing plate is constituted of a combination of a polarizing plate having a fixed composition and a retardation plate having a fixed composition, the value of P(450)/P(650) in the formula (1) of the elliptically polarizing plate can be reduced by increasing the thickness of the retardation plate. The thickness of the retardation plate (the optically anisotropic layer) of the present invention, which can be determined appropriately such that a desired retardation value can be obtained depending on the type, etc. of the polymerizable liquid crystal compound to constitute the retardation plate, is usually preferable to be 0.1 to 5 μm, more preferably 0.5 to 4 μm, and even more preferably 1 to 3 μm. The thickness can be controlled by adjusting the amount of the solvent contained in the composition for forming an optically anisotropic layer and the thickness of the coating film formed of the composition for forming an optically anisotropic layer, for example. The thickness of the coating film can be adjusted by varying the thickness of a wire bar to be used in application, adjusting the amount of ejection by a die coater, or varying the depth of a groove or the peripheral speed of a microgravure coater.

The elliptically polarizing plate of the present invention comprises at least one polarizing plate. A polarizing plate has an item having a function to extract linearly polarized light from natural light that enters. Specific examples of the polarizing plate include a polarizing plate in which a polyvinyl alcohol (PVA) polarizer in which a dichroic dye, such as iodine and dichroic dyed, is adsorbed and aligned on a uniaxially stretched PVA-based resin film is protected with a polymer film (protective film) on its one side or both sides. In this case, the film to be used as the protective film is a transparent resin film, for example, and examples of the transparent resin include acetyl cellulose-based resins typified by triacetylcellulose and diacetyl cellulose, methacrylic resins typified by polymethyl methacrylate, polyester resins, polyolefin-based resins, polycarbonate resins, polyetheretherketone resin, and polysulfone resins. A liquid crystal host-guest type polarizing plate can also be used. As the liquid crystal host-guest type polarizing plate, those disclosed as examples in JP-A-2012-58381, JP-A-2013-37115, WO2012/147633, and WO2014/091921, for example, can be used. While the thickness of a polarizer is not particularly limited, a polarizer having a thickness of 0.5 to 35 μm is usually used.

The polarizing plate is a film provided with polarized light absorption selectivity by aligning iodine or a dichroic dye in stretched PVA or an aligned liquid crystal. The major axis direction of alignment of an iodine-PVA complex or a dichroic dye is called an absorption axis, and the minor axis direction of the iodine-PVA complex or the dichroic dye is called a transmission axis. Completely linearly polarized light produced with a prism in parallel to each of the absorption axis and the transmission axis is allowed to permeate, and from the light intensity before and after the permeation are measured the absorbance with respect to each of the absorption axis and the transmission axis. In the present invention, it is possible to control the optical characteristics of the elliptically polarizing plate by controlling the absorption characteristics of the polarizing plate as described above. For example, in an elliptically polarizing plate constituted using a retardation plate fixed in composition, the value of P(450)/P(650) in the above formula (1) of the elliptically polarizing plate can be reduced by using a polarizing plate that exhibits more absorption with respect to near a wavelength of 650 nm (red light) than absorption with respect to near a wavelength of 450 nm (blue light) and near a wavelength of 550 nm (green light), that is, a polarizing plate having a more bluish hue. In particular, the elliptically polarizing plate of the present invention can control the absorbance of a polarizing plate because the elliptically polarizing plate satisfies the optical characteristics of formulae (1), (2), and (4).

Specifically, it is preferred that the absorbance (A2) in the absorption axis direction of the polarizing plate satisfies the following formulae (6) through (8).

$$1 \leq A2(450) \leq 6 \quad (6)$$

$$1 \leq A2(550) \leq 6 \quad (7)$$

$$2 \leq A2(650) \leq 6 \quad (8).$$

Due to the optical characteristics satisfying formulae (6) to (8) of the polarizing plate, good light absorption characteristics are obtained in the entire visible region.

Preferably, the absorbance (A1) in the transmission axis direction of the polarizing plate satisfies all of the following formulae (8) through (10).

$$0.001 \leq A1(450) \leq 0.1 \quad (9)$$

$$0.001 \leq A1(550) \leq 0.1 \quad (10)$$

$$0.002 \leq A1(650) \leq 0.2 \quad (11).$$

Due to the optical characteristics satisfying formulae (9) to (10) of the polarizing plate, good light transmission characteristics are obtained in the entire visible region.

In order to attain more absorption of red light near a wavelength of 650 nm, it is more preferred that the absorbance (A2) in the absorption axis direction of the polarizing plate satisfies the following formulae (12) and (13).

$$A2(650) > A2(450) \tag{12}$$

$$A2(650) > A2(550) \tag{13}$$

Due to the optical characteristics satisfying the formulae (12) and (13) of the polarizing plate, reflection of red light can be controlled effectively, and there is afforded an elliptically polarizing plate that suppresses coloring of reflected colors at wavelengths in the entire visible region including red light and that can impart good display characteristics when used for a display device.

Such light absorption characteristics can be attained in the case of an iodine-PVA polarizing plate, for example, by controlling the generation of an I3-PVA complex, which exhibits absorption at short wavelengths, and an I5-PVA complex, which exhibits absorption at long wavelengths. Since an I3-PVA complex and an I5-PVA complex are in a thermal equilibrium state, light absorption characteristics can be controlled by the temperature and $I_2$ concentration/KI concentration during dyeing and the drying condition; for example, absorption characteristics of red light are improved as compared with blue light if the KI concentration is increased. Higher drying temperatures will improve the absorption characteristics of blue light as compared with red light. In the case of a liquid crystal host-guest type polarizing plate, it is possible to control light absorption characteristics easily by controlling the amount of addition or the ratio of a dichroic dye, which is a guest molecule. For example, when mixing a plurality of dyes, only the absorption characteristics of red light can be improved selectively by blending a blue dye more than other dyes. In the elliptically polarizing plate of the present invention, use of a liquid crystal host-guest type polarizing plate is more preferable from the viewpoint of reproducibility, the stability of a process, and reduction in thickness. A polarizing plate containing a polymer obtainable by polymerizing a polymerizable liquid crystal compound with the polymerizable liquid crystal compound and a dichroic dye being aligned is more preferable in that the formulation of a dye can be controlled.

An iodine-PVA polarizing plate can be produced using, for example, a sequential stretching method in which PVA in the form of film in a heated state is stretched and then iodine dyeing and crosslinking treatment with boric acid are performed, or a simultaneous stretching method in which PVA in the form of film is stretched while performing iodine dyeing and crosslinking treatment with boric acid in water. The stretching ratio in this case is preferably 4 times to 8 times, and an iodine-PVA polarizing plate can be produced by continuously immersing a PVA film in an aqueous iodine solution and an aqueous boric acid solution to impregnate the film with the individual molecules. A PVA polarizer can be obtained by, after dyeing, drying the PVA film, thereby removing moisture and advancing boric acid crosslinking. As to the drying method in this case, it is conducted preferably by a draught drying method or an infrared drying method, and the temperature is preferably within the range of 40° C. to 150° C., more preferably 60° C. to 130° C. By adhering the transparent substrate previously described to the thus-obtained PVA polarizer on one side or both sides thereof to protect the polarizer, an iodine-PVA polarizing plate can be produced.

In the case of using a liquid crystal host-guest type polarizing plate, while an iodine-PVA polarizing plate can be produced in the same procedures as those for an retardation plate by mixing a dichroic dye beforehand in the layer formed of a polymer in the aligned state of a polymerizable liquid crystal compound, a highly ordered liquid crystal structure is required in order to satisfy the above formulae (6) to (11) at the same time. That is, as a polymerizable liquid crystal compound, a smectic liquid crystal compound is preferred to a nematic liquid crystal compound, and a high order smectic liquid crystal compound is more preferred. In particular, higher order smectic liquid crystal compounds forming smectic-B phase, smectic-D phase, smectic-E phase, smectic-F phase, smectic-G phase, smectic-H phase, smectic-I phase, smectic-J phase, smectic-K phase, or smectic-L phase are more preferable, and higher order smectic liquid crystal compounds forming smectic-B phase, smectic-F phase, or smectic-I phase are even more preferable. When the liquid crystal phase formed of the polymerizable liquid crystal compound is such a higher order smectic phase, a liquid crystal cured film with a higher order of alignment can be produced and a higher polarization performance is acquired. A liquid crystal cured film with such a higher order of alignment is characterized in that a Bragg peak resulting from a higher order structure, such as a hexatic phase or a crystal phase, is observed in the X-ray diffraction measurement thereof. The Bragg peak is a peak resulting from the periodic structure of molecular alignment, and a film having a periodic interval of 3.0 to 6.0 angstrom can be obtained.

Examples of such a compound include compounds represented by the following formula (III) (hereinafter sometimes referred to as "compound (III)"), and it is preferred that the polarizing plate to constitute the elliptically polarizing plate of the present invention is formed from a polymerizable liquid crystal compound containing a compound (III). These polymerizable liquid crystal compounds may be used individually or two or more of them may be combined.

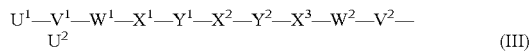
$$\tag{III}$$

In formula (III), $X^1$, $X^2$, and $X^3$ each independently represent a divalent aromatic group or a divalent alicyclic hydrocarbon group, wherein the hydrogen atoms contained in the divalent aromatic group or the divalent alicyclic hydrocarbon group each may have been substituted for a halogen atom, an alkyl group having 1 to 4 carbon atoms, a fluoroalkyl group having 1 to 4 carbon atoms, an alkoxy group having 1 to 4 carbon atoms, a cyano group, or a nitro group, and the carbon atoms constituting the divalent aromatic group or the divalent alicyclic hydrocarbon group each may have been replaced by an oxygen atom, a sulfur atom, or a nitrogen atom. It is noted that at least one of $X^1$, $X^2$, and $X^3$ is a 1,4-phenylene group optionally having a substituent or a cyclohexane-1,4-diyl group optionally having a substituent.

$Y^1$, $Y^2$, $W^1$, and $W^2$ each independently are a single bond or a divalent linking group.

$V^1$ and $V^2$ each independently represent an alkanediyl group having 1 to 20 carbon atoms optionally having a substituent, and —$CH_2$— forming the alkanediyl group may have been replaced by —O—, —S—, or —NH—.

$U^1$ and $U^2$ each independently represent a polymerizable group or a hydrogen atom, and at least one of them is a polymerizable group.

In the compound (III), at least one of $X^1$, $X^2$, and $X^3$ is a 1,4-phenylene group optionally having a substituent or a cyclohexane-1,4-diyl group optionally having a substituent. In particular, $X^1$ and $X^3$ are preferably a cyclohexane-1,4-diyl group optionally having a substituent, and the cyclohexane-1,4-diyl group is more preferably a trans-cyclohexane-1,4-diyl group. When containing the structure of a trans-cyclohexane-1,4-diyl group, smectic liquid crystallinity tends to readily be generated. Examples of the substituent that the 1,4-phenylene group optionally having a substituent or the cyclohexane-1,4-diyl group optionally having a substituent arbitrarily has include an alkyl group having 1 to 4 carbon atoms, such as a methyl group, an ethyl group, and a butyl group, a cyano group, and a halogen atom, such as a chlorine atom and a fluorine atom. Preferably, the 1,4-phenylene group and the cyclohexane-1,4-diyl group are unsubstituted.

$Y^1$ and $Y^2$ are each preferably a single bond, —$CH_2CH_2$—, —$CH_2O$—, —COO—, —OCO—, —N=N—, —$CR^a$=$CR^b$—, —C≡C—, or —$CR^a$=N—, wherein $R^a$ and $R^b$ each independently represent a hydrogen atom or an alkyl group having 1 to 4 carbon atoms. It is more preferred that $Y^1$ and $Y^2$ be —$CH_2CH_2$—, —COO—, —OCO—, or a single bond, and it is more preferred that $Y^1$ and $Y^2$ be of linkage systems differing from each other. When $Y^1$ and $Y^2$ are of linkage systems differing from each other, smectic liquid crystallinity tends to readily be generated.

It is preferred that $W^1$ and $W^2$ each independently be a single bond, —O—, —S—, —COO—, or —OCO— and it is more preferred that $W^1$ and $W^2$ each independently be a single bond or —O—.

Examples of the alkanediyl group having 1 to 20 carbon atoms represented by $V^1$ and $V^2$ include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, a decane-1,10-diyl group, a tetradecane-1,14-diyl group, and an eicosane-1,20-diyl group. $V^1$ and $V^2$ are preferably alkanediyl groups having 2 to 12 carbon atoms, and more preferably alkanediyl groups having 6 to 12 carbon atoms. Due to adopting linear alkanediyl groups having 6 to 12 carbon atoms, crystallinity is improved and smectic liquid crystallinity tends to readily be generated.

While examples of the substituent that the alkanediyl group having 1 to 20 carbon atoms optionally having a substituent include a cyano group and a halogen atom, such as a chlorine atom and a fluorine atom, the alkanediyl group preferably is unsubstituted, and more preferably is an unsubstituted linear alkanediyl group.

It is preferred that both $U^1$ and $U^2$ be polymerizable groups, and more preferably, both are photopolymerizable groups. A polymerizable liquid crystal compound having a photopolymerizable group is advantageous in that it can be polymerized at lower temperature conditions.

The polymerizable groups represented by $U^1$ and $U^2$ are preferably identical though they may differ from each other. Examples of the photopolymerizable group include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Especially, an acryloyloxy group, a methacryloyloxy group, a vinyloxy group, an oxiranyl group, and an oxetanyl group are preferred, and an acryloyloxy group is more preferred.

Examples of such a polymerizable liquid crystal compound include the following.

[Chemical Formula 4]

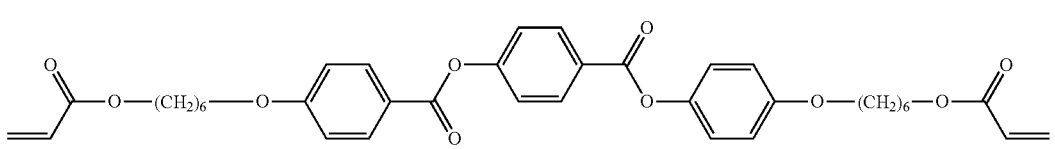

(1-1)

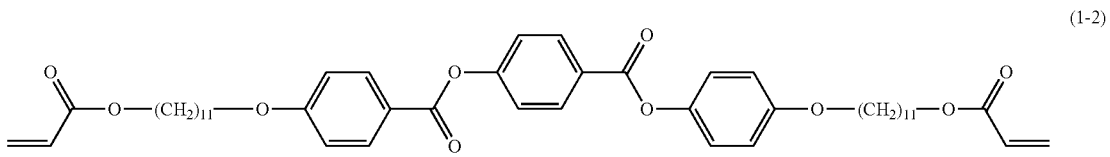

(1-2)

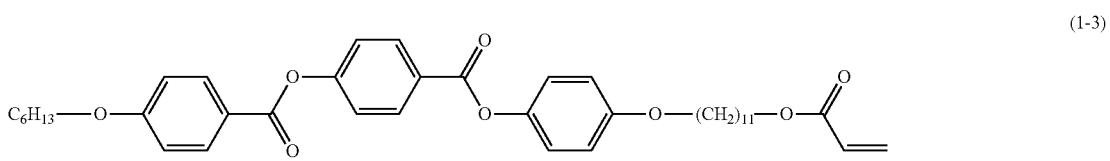

(1-3)

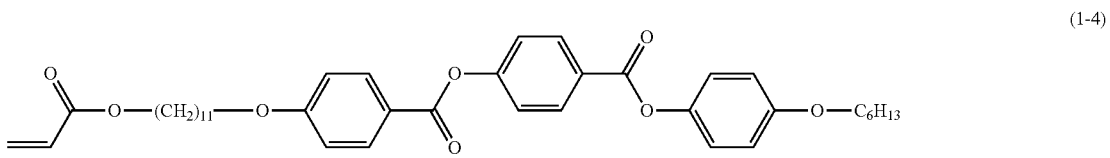

(1-4)

(1-5)
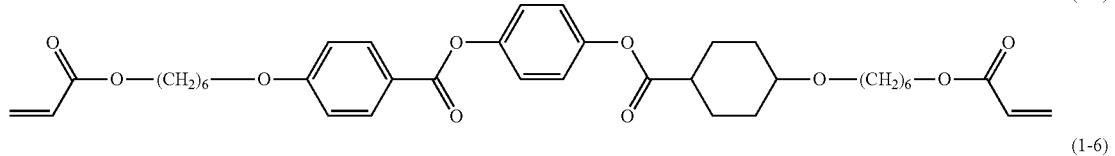
(1-6)
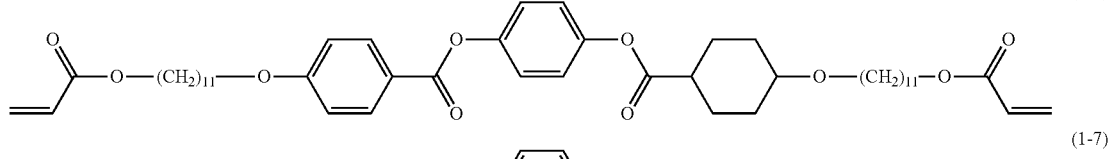
(1-7)
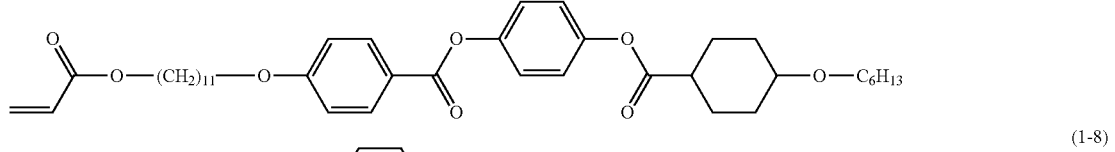
(1-8)
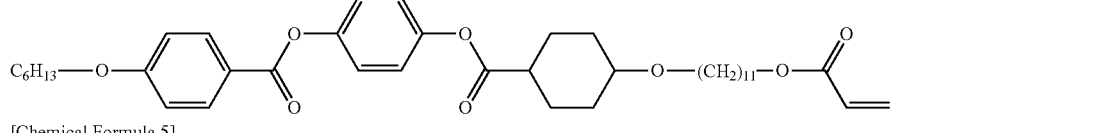
[Chemical Formula 5]
(1-9)
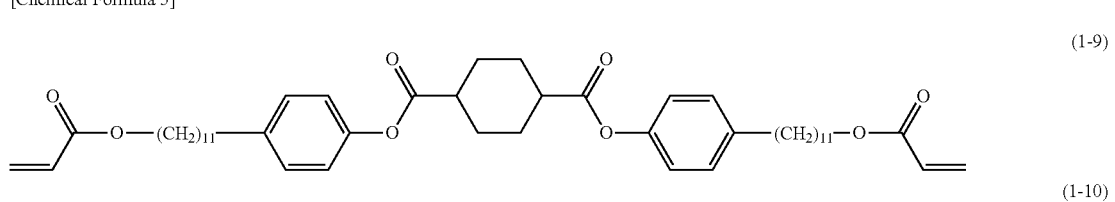
(1-10)
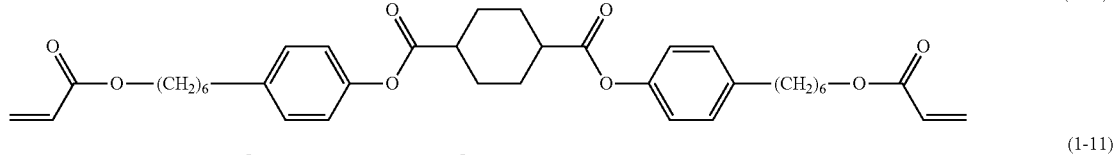
(1-11)
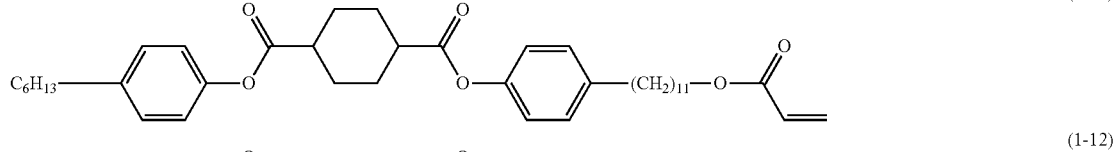
(1-12)
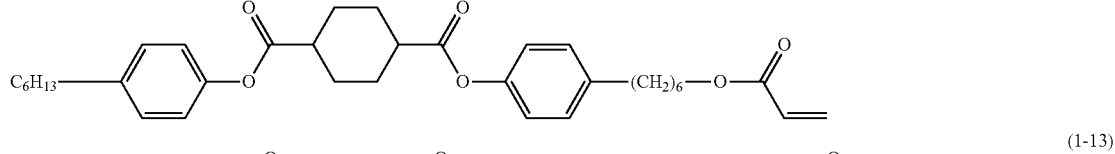
(1-13)
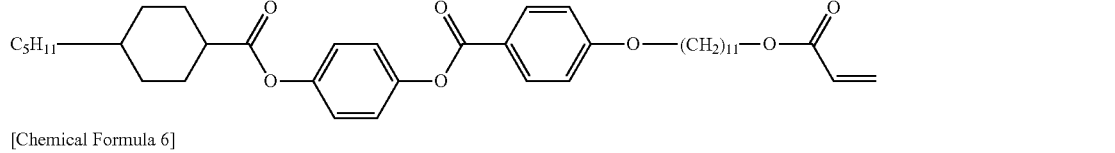
[Chemical Formula 6]
(1-14)
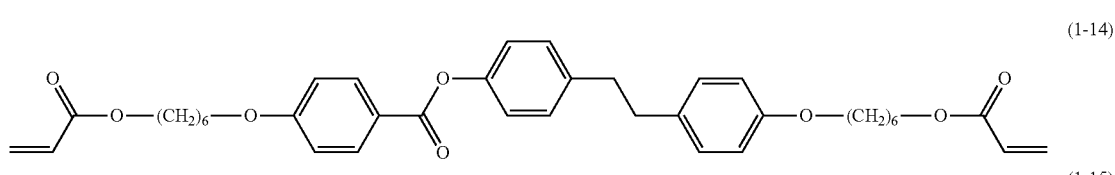
(1-15)
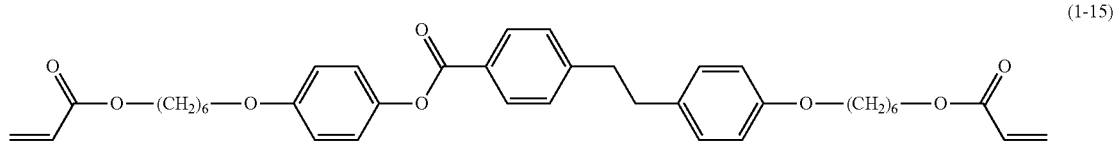

-continued

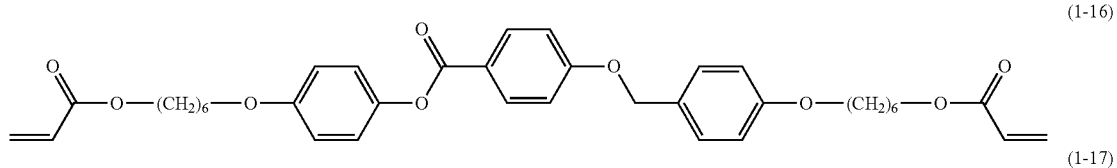
(1-16)

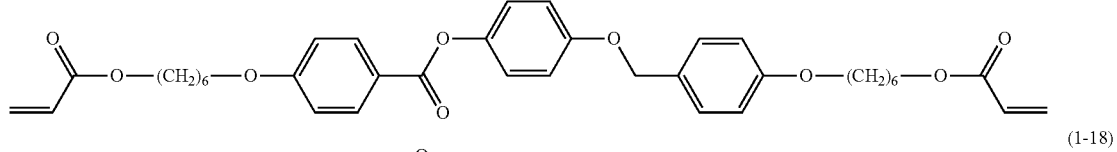
(1-17)

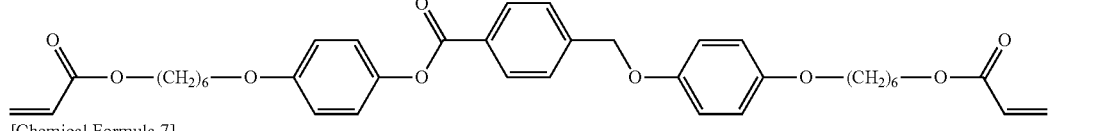
(1-18)

[Chemical Formula 7]

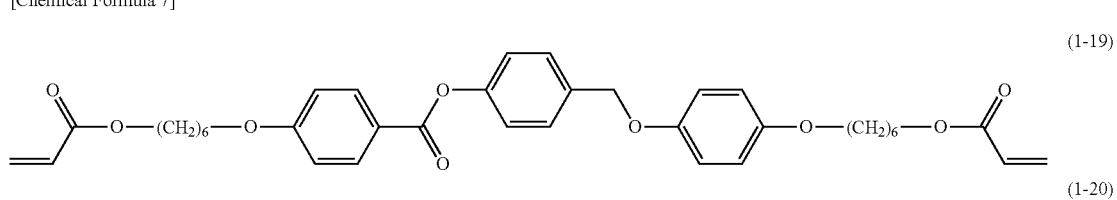
(1-19)

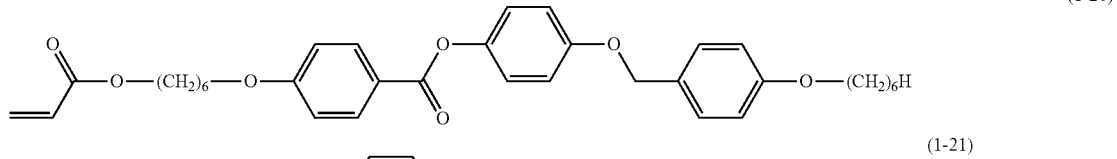
(1-20)

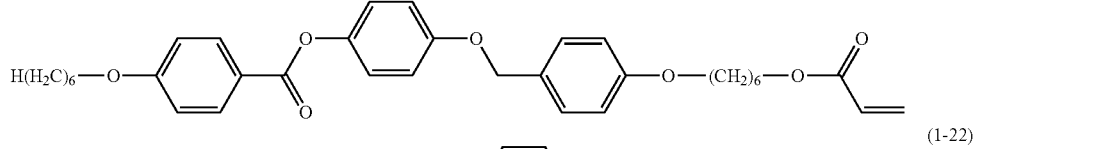
(1-21)

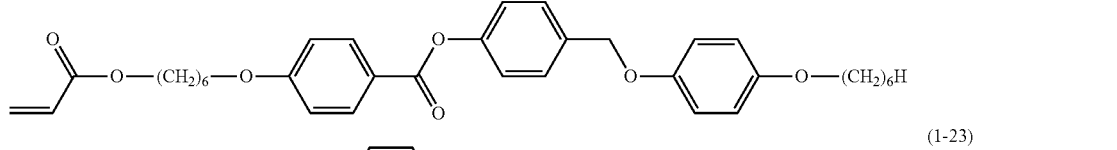
(1-22)

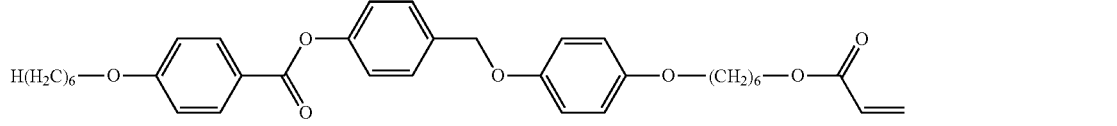
(1-23)

Of the compounds disclosed as examples, at least one selected from the group consisting of the compounds represented by formulae (1-2), (1-3), (1-4), (1-6), (1-7), (1-8), (1-13), (1-14), and (1-15) is preferred.

The dichroic dye refers to a dye characterized in that the absorbance in the major axis direction of its molecule differs from the absorbance in the minor axis direction.

Preferred as the dichroic dye is one having an absorbance maximum wavelength (λMAX) within the range of 300 to 700 nm. Examples of such a dichroic dye include acridine dyes, oxazine dyes, cyanine dyes, naphthalene dyes, azo dyes, and anthraquinone dyes, and especially, azo dyes are preferred. Examples of azo dyes include monoazodyes, bisazodyes, trisazodyes, tetrakisazo dyes, and stilbeneazo dyes, and preferred are bisazo dyes and trisazo dyes. While dichroic dyes may be used either individually or in combination, it is preferred to combine three or more dichroic dyes, and it is more preferred to combine three or more azo dyes. Combining three or more dichroic dyes, especially, three or more azo dyes makes it easy to control polarization characteristics in the entire visible region. In combining three or more dichroic dyes, using a dichroic dye that exhibits absorption at a longest wavelength more than other two dichroic dyes is preferable as a means to solve the challenge of the present invention.

Examples of the azo dyes include compounds represented by formula (IV) (hereinafter, sometimes referred to as "compound (IV)").

$$A^1(-N=N-A^2)_p-N=N-A^3 \qquad (IV)$$

In formula (IV), $A^1$ and $A^3$ each independently represent a phenyl group optionally having a substituent, a naphthyl group optionally having a substituent, or a monovalent heterocyclic group optionally having a substituent. $A^2$ represents a 1,4-phenylene group optionally having a substituent, a naphthalene-1,4-diyl group optionally having a substituent, or a divalent heterocyclic group optionally having a substituent. p represents an integer of 1 to 4. When p is an integer of 2 or more, the plurality of $A^2$s may be either the same or different.

Examples of the monovalent heterocyclic group include groups formed by removing one hydrogen atom from heterocyclic compounds, such as quinoline, thiazole, benzothiazole, thienothiazole, imidazole, benzimidazole, oxazole, and benzoxazole. Examples of the divalent heterocyclic group include groups formed by removing two hydrogen atoms from the heterocyclic compounds mentioned above.

Examples of the substituent which the phenyl group, the naphthyl group, and the monovalent heterocyclic group in $A^1$ and $A^3$ and the 1,4-phenylene group, the naphthalene-1,4-diyl group, and the divalent heterocyclic group in $A^2$ arbitrarily have include alkyl groups having 1 to 4 carbon atoms, such as a methyl group, an ethyl group, and a butyl group; alkoxy groups having 1 to 4 carbon atoms, such as a methoxy group, an ethoxy group, and a butoxy group; fluoridated alkyl groups having 1 to 4 carbon atoms, such as a trifluoromethyl group; a cyano group; a nitro group; halogen atoms, such as a chlorine atom and a fluorine atom; and substituted or unsubstituted amino groups, such as an amino group, a diethylamino group, and a pyrrolidino group (a substituted amino group means an amino group having one or two alkyl groups having 1 to 6 carbon atoms, or an amino group in which two substituted alkyl groups are linked together to form an alkanediyl group having 2 to 8 carbon atoms, and the unsubstituted amino group is —$NH_2$). Examples of the alkyl groups having 1 to 6 carbon atoms include a methyl group, an ethyl group, and a hexyl group. Examples of the alkanediyl group having 2 to 8 carbon atoms include an ethylene group, a propane-1,3-diyl group, a butane-1,3-diyl group, a butane-1,4-diyl group, a pentane-1,5-diyl group, a hexane-1,6-diyl group, a heptane-1,7-diyl group, and an octane-1,8-diyl group.

Examples of such azo dyes include the following.

In formulae (2-1) to (2-6), $B^1$ through $B^{20}$ each independently represent a hydrogen atom, an alkyl group having 1 to 4 carbon atoms, an alkoxy group having 1 to 4 carbon atoms, a cyano group, a nitro group, or a substituted or unsubstituted amino group (the substituted amino group and the unsubstituted amino group are as defined above).

n1 through n4 each independently represent an integer of 0 to 3.

When n1 is 2 or more, the plurality of $B^2$s may be either the same or different.

When n2 is 2 or more, the plurality of $B^6$s may be either the same or different.

When n3 is 2 or more, the plurality of $B^9$s may be either the same or different.

When n4 is 2 or more, the plurality of $B^{14}$s may be either the same or different.

The liquid crystal host-guest type polarizing plate can be produced by the method described below, for example. A polymer of polymerizable liquid crystal compound in an aligned state of a mixture of the polymerizable liquid crystal compound and a dichroic dye is produced by, for example, applying a composition containing the polymerizable liquid crystal compound and the dichroic dye optionally diluted with a solvent (hereinafter sometimes referred to as "composition for forming a polarizing film") to a substrate or an orientation film formed on the substrate, and performing polymerization after optionally drying the solvent. By polymerizing a polymerizable liquid crystal compound while maintaining a state where the polymerizable liquid crystal compound and a dichroic dye are aligned horizontally, a liquid crystal cured film in which the aligned state is maintained the aligned state, and such a liquid crystal cured film constitutes a host-guest type polarizing plate. In such a case, in order to acquire high polarization performance, it is preferred to polymerize the polymerizable liquid crystal

[Chemical Formula 8]

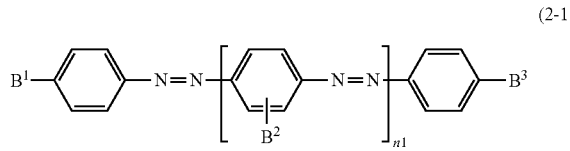

(2-1)

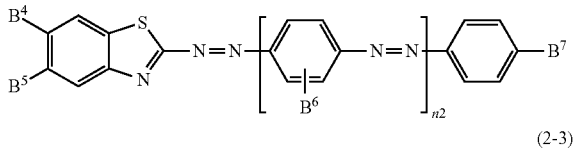

(2-2)

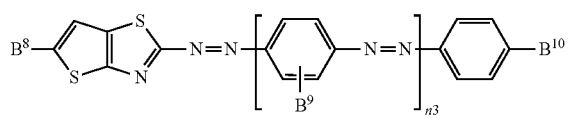

(2-3)

[Chemical Formula 9]

(2-4)

(2-5)

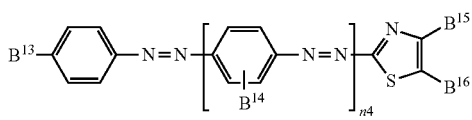

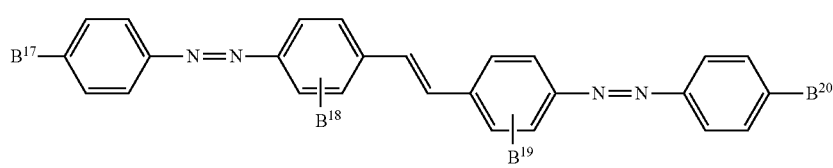

(2-6)

compound while maintaining the aligned state in a smectic liquid crystal phase, and it is more preferred to polymerize the polymerizable liquid crystal compound while maintaining the aligned state in a high order smectic liquid crystal phase. The composition for forming a polarizing film may contain ingredients known in the art, such as a solvent, a polymerization initiator, a polymerization inhibitor, a photosensitizer, and a leveling agent, and examples of such ingredients include those to be used in the composition for forming an optically anisotropic layer previously described about the retardation plate. As the methods of the preparation and the application of the composition for forming a polarizing film, the same methods as those used for the composition for forming an optically anisotropic layer previously described about the retardation plate can in principle be applied, and also as to the orientation film to be used here (composition for forming a photo-orientation film), etc., the same ones as those previously described are enumerated as examples.

From the viewpoint of development of liquid crystallinity, the content of the polymerizable liquid crystal compound in the composition for forming a polarizing film (when a plurality of polymerizable liquid crystal compounds are contained, the total amount thereof) is usually 60 to 99 parts by mass, preferably 70 to 95 parts by mass, more preferably 75 to 90 parts by mass, relative to 100 parts by mass of the solid content of the composition for forming a polarizing film. From the viewpoint of acquiring good optical absorption characteristics, the content of the dichroic dye (when a plurality of dichroic dyes are contained, the total amount thereof) is usually 1 to 30 parts by mass, preferably 2 to 20 parts by mass, more preferably 3 to 15 parts by mass, relative to 100 parts by mass of the solid content of the composition for forming a polarizing film. The solid content as referred to herein means the total amount of the ingredients of the composition for forming a polarizing film excluding a solvent.

The elliptically polarizing plate 1 of the present invention comprises a polarization plate 2 and a retardation plate 3, and the elliptically polarizing plate of the present invention can be produced by laminating the polarization plate and the retardation plate via an adhesive layer or the like (see FIG. 1).

In one embodiment of the present invention, when a polarizing plate and a retardation plate are laminated, it is preferred to laminate the plates such that the slow axis (the optic axis) of the retardation plate and the absorption axis of the polarizing plate may form an angle of substantially 45°.

A function as an elliptically polarizing plate can be acquired by laminating the plates such that the slow axis (the optic axis) of the retardation plate of the present invention and the absorption axis of the polarizing plate may form an angle of substantially 45°. The angle of substantially 45° usually means an angle being within a range of 45±5°.

The elliptically polarizing plate of the present invention may have the constituents which a conventional common elliptically polarizing plate has or a polarizing plate and a retardation plate have. Examples of such constituents include a pressure-sensitive adhesive layer (sheet) for sticking an elliptically polarizing plate to a display element such as an organic EL, and a protective film to be used in order to protect the surface of a polarizing plate or a retardation plate from scratching or staining. The elliptically polarizing plate of the present invention is cut according to necessity and can be used for display devices, such as an organic EL display device and a liquid crystal display device.

In another embodiment of the present invention, a liquid crystal display device and an organic EL display device comprising the elliptically polarizing plate 1 described above can be provided. These display devices can develop good color demonstration due to having the elliptically polarizing plate of the present invention, which can suppress coloring of reflected colors at wavelengths in the entire visible region.

EXAMPLES

The present invention will be described in more detail by examples and comparative examples. "%" and "part (s)" in the examples and the comparative examples refer to "% by mass" and "part(s) by mass", unless otherwise described.
Preparation of Elliptically Polarizing Plate In the production of a retardation plate, the "composition for forming a photo-orientation film" and the "composition containing a polymerizable liquid crystal compound" each described below were used.

(1) Comparative Example 1

[Preparation of Composition for Forming Photo-Orientation Film]

A composition for forming a photo-orientation film was prepared by mixing 5 parts of the photo-alignment material described below and 95 parts of cyclopentanone (solvent), and stirring the resulting mixture at 80° C. for one hour. The photo-alignment material was synthesized using a method disclosed in JP-A-2013-33248.

[Chemical Formula 10]

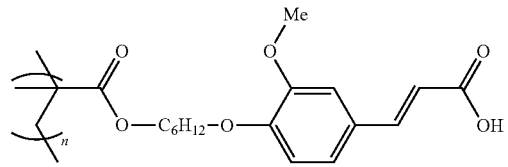

[Preparation of Composition a Containing Polymerizable Liquid Crystal Compound]

Composition A containing polymerizable liquid crystal compound A described below was prepared by mixing the polymerizable liquid crystal compound A (12.0 parts), a leveling agent (0.12 parts, BYK-361 N; produced by BYK-Chemie), the polymerization initiator described below (0.72 parts), and cyclopentanone (100 parts, solvent). The polymerizable liquid crystal compound A was synthesized using a method disclosed in JP-A-2010-31223. Measurement using a UV-VIS spectrophotometer (UV3150, produced by Shimadzu Corporation) found that the maximum absorption wavelength λmax (LC) of the polymerizable liquid crystal compound A was 350 nm.

Polymerizable Liquid Crystal Compound A:

[Chemical Formula 11]

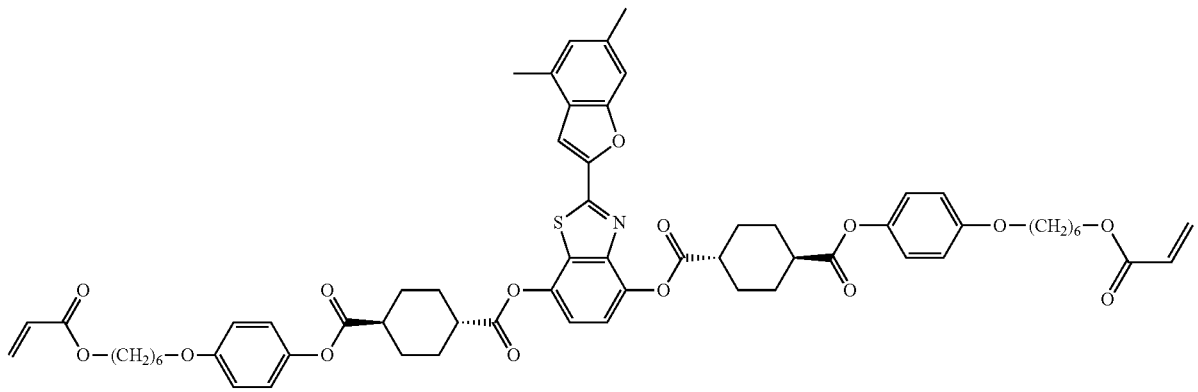

Polymerization initiator:
2-dimethylamino-2-benzyl-1-(4-morpholinophenyl)butan-1-one (Irgacure 369; produced by Ciba Specialty Chemicals)

Leveling agent: polyacrylate compound (BYK-361N; produced by BYK-Chemie)

[Method for Producing Retardation Plate]

A cycloolefin polymer film (COP; ZF-14; produced by Zeon Corporation) was treated once at an output of 0.3 kW and a treating rate of 3 m/minute by using a corona treater (AGF-B10; produced by Kasuga Electric Works, Ltd.). The composition for forming a photo-orientation film was applied to the corona treated surface with a bar coater, dried at 80° C. for one minute, and then subjected to polarized UV exposure at a light integral of 100 mJ/cm$^2$ by using a polarized UV irradiation device (SPOT CURE SP-7 with a polarizer unit; produced by USHIO INC.), and thus an orientation film was formed. The thickness of the resulting orientation film was measured with an ellipsometer M-220 (produced by JASCO Corporation) to be 100 nm.

Subsequently, the composition A containing a polymerizable liquid crystal compound prepared previously was applied onto the orientation film at a rate of 50 mm/sec with the wire of the bar coater adjusted to #30 and then dried at 120° C. for one minute. Then, an ultraviolet ray (under a nitrogen atmosphere, light integral at a wavelength of 313 nm: 500 mJ/cm$^2$) was applied using a high-pressure mercury lamp (Unicure VB-15201 BY-A; produced by USHIO INC.) to the orientation film from the side of the surface to which the composition A had been applied, and thus retardation plate A containing optically anisotropic layer 1 (retardation film) was formed. The thickness of the optically anisotropic layer 1 contained in the resulting retardation plate A was measured with a laser microscope (LEXT; produced by Olympus Corporation) to be 2.28 μm.

[Measurement of Optical Characteristics of in-Plane Retardation Value Re (λ)]

In order to measure the in-plane retardation value Re (λ) of retardation plate A (optically anisotropic layer 1), a sample for measurement was produced by adhering a sheet-shaped pressure-sensitive adhesive (acrylic pressure-sensitive adhesive produced by LINTEC Corporation, colorless, transparent, unaligned) to the optically anisotropic layer 1 side of the retardation plate A prepared in a similar manner separately, adhering the resultant to a glass plate (having an in-plane retardation of 0 (zero) at 450 nm, 550 nm, and 650 nm) on its pressure-sensitive adhesive side, and then peeling the cycloolefin polymer film to transfer the optically anisotropic layer 1 to the glass plate. Using this sample, in-plane retardation values Re (λ) at a wavelength of 450 nm, a wavelength of 550 nm, and a wavelength of 650 nm were measured by using a birefringence analyzer (KOBRA-WR; produced by Oji Scientific Instruments Co., Ltd.).

The results are shown in Table 2.

The value of Re(450)/Re(550), which is an indicator of the reverse wavelength dispersion of the retardation plate A in Comparative Example 1 was about 0.82, which was a value very close to a theoretical value 450/550=0.818. Re(550)=137 nm, which was a value very close to a theoretical value 550/4 =137.5 nm.

[Production of Polarizing Plate I: Production of Iodine-PVA Type Polarizing Plate]

A 30 μm thick polyvinyl alcohol film (average degree of polymerization: about 2400; degree of saponification: 99.9 mol % or more) was uniaxially stretched about 5 times by dry stretching, and then immersed in pure water at 40° C. for 40 seconds while maintaining a tension state. Then, the film was immersed in an aqueous dying solution having a mass ratio of iodine/potassium iodide/water=0.044/5.7/100 at 28° C. for 30 seconds, thereby performed dyeing treatment.

Then, the film was immersed in an aqueous boric acid solution having a mass ratio of potassium iodide/boric acid/water =11.0/6.2/100 at 70° C. for 120 seconds. Subsequently, the film was washed with pure water at 8° C. for 15 seconds, and then dried at 60° C. for 50 seconds and subsequently at 75° C. for 20 seconds with the film held at a tension of 300 N, and thus there was obtained a 12 μm thick polarizer in which iodine was adsorbed and aligned on the polyvinyl alcohol film.

A water-based adhesive was injected to between the resulting polarizer and a triacetylcellulose films (TAC, KC4UY produced by KONICA MINOLTA, INC.), which were then stuck together with a nip roll. The resulting stack was dried at 60° C. for 2 minutes while maintaining the tension thereof at 430 N/m, and thus polarizing plate I having a cycloolefin film as a protective film on its one side was prepared. The above-mentioned water-based adhesive was prepared by adding 3 parts of a carboxyl group-modification polyvinyl alcohol (KURARAY POVAL KL318; produced by KURARAY CO., LTD.) and 1.5 parts of a water-soluble polyamide epoxy resin (Sumirez Resin 650; produced by Sumika Chemtex Co., Ltd., aqueous solution having a solid concentration of 30%) to 100 parts of water.

The absorption characteristics of the resulting polarizing plate I were measured as follows.

Using an apparatus in which a folder with a polarizer was mounted in a spectrophotometer (V-7100; produced by JASCO Corporation), the absorbances in the transmission direction and in the absorption direction of the resulting polarizing plate I were measured in 2 nm steps within a wavelength range of 380 to 680 nm by the double beam method. The absorbances at 450 nm, 550 nm, and 650 nm are shown in Table 1. The absorbances at individual wavelengths, which have an effect on reflected hue, were A2(450)= 4.7, A2(550)=4.9, and A2(650)=5.0, which indicated a very neutral hue.

The polarizing plate I and the retardation plate A prepared as described above were stuck together using a pressure-sensitive adhesive (acrylic pressure-sensitive adhesive produced by LINTEC Corporation, colorless, transparent, unaligned) such that the angle ($\theta$) formed by the absorption axis of the polarizing plate I and the slow axis of the retardation plate A might be 45°, and thus elliptically polarizing plate 1 was produced. An aluminum reflective substrate (manufacturer: HIKARI, product code: HA0323) was further stuck to the elliptically polarizing plate on its retardation plate side via a pressure-sensitive adhesive. The resulting stack was irradiated with light emitted by a C light source, from the polarizing plate side at an angle of 6°, and a reflection spectrum was measured. From the resulting reflection spectrum and the color matching functions of the C light source was calculated the reflection chromaticity a* in the L*a*b* (CIE) color system. The result is shown in Table 2. A larger reflection chromaticity a* indicates higher redness. The calculated value of P($\lambda$), P(450)/P(650), and the value of 1–P(450) are shown in Table 2.

(2) Example 1

A retardation plate (type A) containing a 2.42 µm-thick optically anisotropic layer was produced by the same method as that used in Comparative Example 1 except that the amount of the solvent used in the preparation of the composition A containing a polymerizable liquid crystal compound was changed to 95 parts by mass. The resulting retardation plate and a polarizing plate I produced by the same method as that used in Comparative Example 1 were laminated together in the same procedure as that used in Comparative Example 1, and thus an elliptically polarizing plate 2 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(3) Example 2

A retardation plate (type A) containing a 2.50 µm-thick optically anisotropic layer was produced by the same method as that used in Comparative Example 1 except that the amount of the solvent used in the preparation of the composition A containing a polymerizable liquid crystal compound was changed to 91 parts by mass. The resulting retardation plate and a polarizing plate I produced by the same method as that used in Comparative Example 1 were laminated together in the same procedure as that used in Comparative Example 1, and thus an elliptically polarizing plate 3 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(4) Comparative Example 2

A retardation plate (type A) containing a 2.17 µm-thick optically anisotropic layer was produced by the same method as that used in Comparative Example 1 except that the amount of the solvent used in the preparation of the composition A containing a polymerizable liquid crystal compound was changed to 107 parts by mass. The resulting retardation plate and a polarizing plate I produced by the same method as that used in Comparative Example 1 were laminated together in the same procedure as that used in Comparative Example 1, and thus an elliptically polarizing plate 4 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(5) Example 3

A retardation plate B containing a 1.93 µm-thick optically anisotropic layer was produced by the same method as that used in Comparative Example 1 except that composition B containing polymerizable liquid crystal compounds was prepared by changing the amount of the polymerizable liquid crystal compound A in the composition A containing a polymerizable liquid crystal compound of Comparative Example 1 to 10.5 parts by mass, using 1.5 parts by mass of a polymerizable liquid crystal compound B described below, and changing the amount of the solvent to 120 parts by mass and the thickness of the wire of the wire bar used in the application was changed to #30. The resulting retardation plate and a polarizing plate I produced by the same method as that used in Comparative Example 1 were laminated together in the same procedure as that used in Comparative Example 1, and thus an elliptically polarizing plate 5 was produced. The in-plane retardation value Re($\lambda$) and the reflection chromaticity a* of the retardation plate of the resulting elliptically polarizing plate were calculated by the same method as that used in Comparative Example 1. The results are shown in Table 2.

Polymerizable Liquid Crystal Compound B:

[Chemical Formula 12]

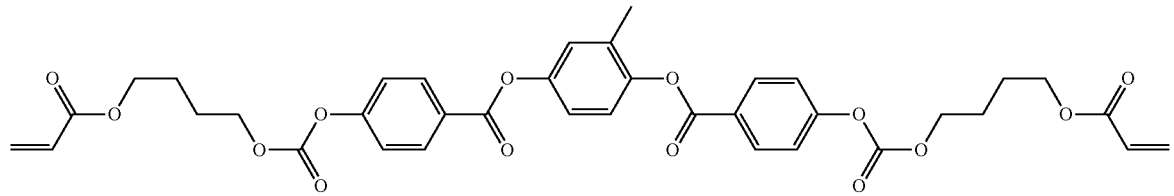

LC242

The polymerizable liquid crystal compound B used was Paliocolor LC242 (produced by BASF A.G.).

(6) Example 4

A retardation plate (type B) containing a 2.01 µm-thick optically anisotropic layer was produced by the same method as that used in Example 3 except that the amount of the solvent used in the preparation of the composition B containing polymerizable liquid crystal compounds was changed to 115 parts by mass and the thickness of the wire of the wire bar used in the application was changed to #30. The resulting retardation plate and a polarizing plate I produced by the same method as that used in Comparative Example 1 were laminated together in the same procedure as that used in Comparative Example 1, and thus an elliptically polarizing plate 6 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(7) Example 5

A retardation plate (type B) containing a 2.14 µm thick optically anisotropic layer was produced by the same method as that used in Example 3 except that the amount of the solvent used in the preparation of the composition B containing polymerizable liquid crystal compounds was changed to 108 parts by mass and the thickness of the wire of the wire bar used in the application was changed to #30. The resulting retardation plate and a polarizing plate I produced by the same method as that used in Comparative Example 1 were laminated together in the same procedure as that used in Comparative Example 1, and thus an elliptically polarizing plate 7 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(8) Comparative Example 3

A retardation plate (type B) containing a 1.86 µm-thick optically anisotropic layer was produced by the same method as that used in Example 3 except that the amount of the solvent used in the preparation of the composition B containing polymerizable liquid crystal compounds was changed to 127 parts by mass and the thickness of the wire of the wire bar used in the application was changed to #30. The resulting retardation plate and a polarizing plate I produced by the same method as that used in Comparative Example 1 were laminated together in the same procedure as that used in Comparative Example 1, and thus an elliptically polarizing plate 8 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(9) Example 6

A retardation plate C containing a 1.72 µm optically anisotropic layer was produced by the same method as that used in Comparative Example 1 except that composition C containing polymerizable liquid crystal compounds was prepared by changing the amount of the polymerizable liquid crystal compound A in the composition A containing a polymerizable liquid crystal compound of Comparative Example 1 to 9.5 parts by mass, using 2.5 parts by mass of the polymerizable liquid crystal compound B, and changing the amount of the solvent to 105 parts by mass and the thickness of the wire of the wire bar used in the application was changed to #20. The resulting retardation plate and a polarizing plate I produced by the same method as that used in Comparative Example 1 were laminated together in the same procedure as that used in Comparative Example 1, and thus an elliptically polarizing plate 9 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(10) Example 7

A retardation plate (type C) containing a 1.76 µm-thick optically anisotropic layer was produced by the same method as that used in Example 6 except that the amount of the solvent used in the preparation of the composition C containing a polymerizable liquid crystal compound was changed to 100 parts by mass and the thickness of the wire of the wire bar used in the application was changed to #20. The resulting retardation plate and a polarizing plate I produced by the same method as that used in Comparative Example 1 were laminated together in the same procedure as that used in Comparative Example 1, and thus an elliptically polarizing plate 10 was produced. The in-plane retardation value Re ($\lambda$) and the reflection chromaticity a* of the retardation plate of the resulting elliptically polarizing plate were calculated by the same method as that used in Comparative Example 1. The results are shown in Table 2.

(11) Comparative Example 4

A retardation plate (type C) containing a 1.61 μm-thick optically anisotropic layer was produced by the same method as that used in Example 6 except that the amount of the solvent used in the preparation of the composition C containing a polymerizable liquid crystal compound was changed to 110 parts by mass and the thickness of the wire of the wire bar used in the application was changed to #20. The resulting retardation plate and a polarizing plate I produced by the same method as that used in Comparative Example 1 were laminated together in the same procedure as that used in Comparative Example 1, and thus an elliptically polarizing plate 11 was produced. The in-plane retardation value Re (λ) and the reflection chromaticity a* of the retardation plate of the resulting elliptically polarizing plate were calculated by the same method as that used in Comparative Example 1. The results are shown in Table 2.

(12) Example 8

Polarizing plate II, which is a host-guest type polarizing plate, produced by the following method was used a polarizing plate.

[Preparation of Composition for Forming Polarizing Film A]

Composition A for forming a polarizing film was prepared by mixing polymerizable liquid crystal compounds C and D, dichroic dyes A to C, a polymerization initiator, a leveling agent, and a solvent shown below, and stirring them at 80° C. for 1 hour. A film formed by spin coating the composition A for forming a polarizing film and then drying the solvent was subjected to texture observation with a polarization microscope while heating the film on a hot plate, and accordingly it was confirmed that there was a smectic liquid crystal that exhibits three liquid crystal phase states between a crystal phase and a liquid phase with temperature change: crystal phase (62° C.) ⇔ smectic B phase (76° C.) ⇔ smectic A phase (105° C.) ⇔ nematic phase (114° C.) ⇔ liquid phase.

Polymerizable Liquid Crystal Compound C (30 Parts):

Dichroic dye A (3.0 parts) λMAX=400 nm:

[Chemical Formula 15]

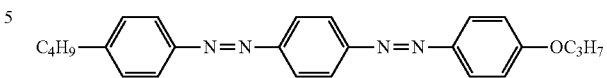

Dichroic dye B (3.0 parts) λMAX=520 nm:

[Chemical Formula 16]

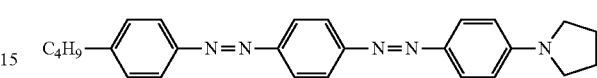

Dichroic dye C (4.3 parts) λMAX=640 nm:

[Chemical Formula 17]

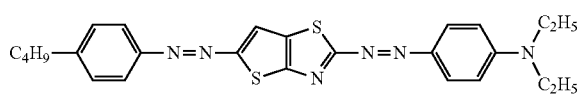

Polymerization initiator:
2-dimethylamino-2-benzyl-1-(4-morpholinophenyl)butan-1-one (Irgacure 369; produced by Ciba Specialty Chemicals) (2.4 parts)
Leveling agent: polyacrylate compound (BYK-361N; produced by BYK-Chemie) (0.6 parts)
Solvent: toluene (100 parts)

[Method for Producing Host-Guest Type Polarizing Plate]

A triacetylcellulose polymer film (TAC; KC4UY; produced by KONICA MINOLTA, INC.) was treated once at an output of 0.3 kW and a treating rate of 3 m/minute by using a corona treater (AGF-B10; produced by Kasuga Electric Works, Ltd.). A composition for forming an orientation film and a photo-orientation film prepared by the same method as Comparative Example 1 was applied to the corona treated surface with a bar coater, dried at 80° C. for one minute, and then subjected to polarized UV exposure at a light integral of 100 mJ/cm² by using a polarized UV irradiation device (SPOT CURE SP-7 with a polarizer unit; produced by USHIO INC.), and thus an orientation film was formed. The

[Chemical Formula 13]

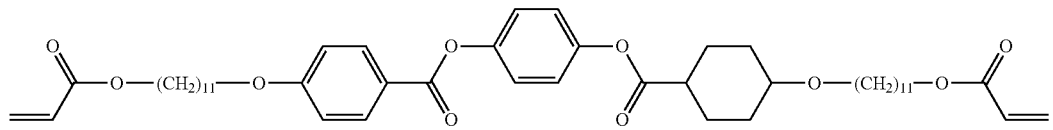

Polymerizable Liquid Crystal Compound D (10 Parts):

[Chemical Formula 14]

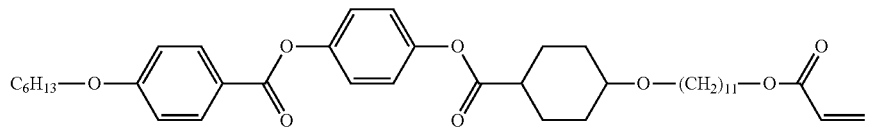

thickness of the resulting orientation film was measured with an ellipsometer M-220 (produced by JASCO Corporation) to be 100 nm.

Subsequently, the composition A for forming a polarizing film prepared previously was applied onto the resulting orientation film at a rate of 25 mm/sec with the wire of the bar coater adjusted to #10 and then dried at 120° C. for one minute. Then, an ultraviolet ray (under a nitrogen atmosphere, light integral at a wavelength of 313 nm: 500 mJ/cm$^2$) was applied using a high-pressure mercury lamp (Unicure VB-15201 BY-A; produced by USHIO INC.) to the orientation film from the side of the surface to which the composition A had been applied, and thus there was formed polarizing plate II containing a polymer obtainable by polymerizing a polymerizable liquid crystal compound with the polymerizable liquid crystal compound and a dichroic dye being aligned. The thickness of the polymer obtained was measured with a laser microscope (LEXT; produced by Olympus Corporation) to be 2.10 μm.

The absorption characteristics of the resulting polarizing plate II were measured in the same manner as in Comparative Example 1. Results are shown in Table 1.

The absorbances at wavelengths, which have an effect on reflected hue, were A2(450)=1.8, A2(550)=2.0, and A2(650)=3.2, which indicated a bluish hue.

The polarizing plate II prepared as described above and a retardation plate (type A, the thickness of the optically anisotropic layer: 2.17 μm) prepared by the same as that of Comparative Example 2 were stuck together using a pressure-sensitive adhesive (acrylic pressure-sensitive adhesive produced by LINTEC Corporation) such that the angle (θ) formed by the absorption axis of the polarizing plate II and the slow axis of the retardation plate might be 45°, and thus elliptically polarizing plate 12 was produced. An aluminum reflective substrate (manufacturer: HIKARI, product code: HA0323) was further stuck to the elliptically polarizing plate on its retardation plate side via a pressure-sensitive adhesive. The resulting stack was irradiated with light emitted by a C light source, from the polarizing plate side at an angle of 6°, and a reflection spectrum was measured. From the resulting reflection spectrum and the color matching functions of the C light source was calculated the reflection chromaticity a* in the L*a*b* (CIE) color system. The results are shown in Table 2. The in-plane retardation value Re(λ) of the retardation plate measured by the same method as that used in Comparative Example 1, the calculated value of P(λ), P(450)/P(650), and the value of 1−P(450) are shown in Table 2.

(13) Example 9

A polarizing plate II produced by the same method as that used in Example 8 and a retardation plate (type A, the thickness of the optically anisotropic layer: 2.28 μm) produced by the same method as that used in Comparative Example 1 were laminated in the same procedure as that used in Example 8, and thus an elliptically polarizing plate 13 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(14) Example 10

A polarizing plate II produced by the same method as that used in Example 8 and a retardation plate (type A, the thickness of the optically anisotropic layer: 2.42 μm) produced by the same method as that used in Example 1 were laminated in the same procedure as that used in Example 8, and thus an elliptically polarizing plate 14 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(15) Example 11

A polarizing plate II produced by the same method as that used in Example 8 and a retardation plate (type B, the thickness of the optically anisotropic layer: 1.86 μm) produced by the same method as that used in Comparative Example 3 were laminated in the same procedure as that used in Example 8, and thus an elliptically polarizing plate 15 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(16) Example 12

A polarizing plate II produced by the same method as that used in Example 8 and a retardation plate (type B, the thickness of the optically anisotropic layer: 1.93 μm) produced by the same method as that used in Example 3 were laminated in the same procedure as that used in Example 8, and thus an elliptically polarizing plate 16 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(17) Example 13

A polarizing plate II produced by the same method as that used in Example 8 and a retardation plate (type B, the thickness of the optically anisotropic layer: 2.01 μm) produced by the same method as that used in Example 4 were laminated in the same procedure as that used in Example 8, and thus an elliptically polarizing plate 17 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(18) Example 14

A polarizing plate II produced by the same method as that used in Example 8 and a retardation plate (type C, the thickness of the optically anisotropic layer: 1.61 μm) produced by the same method as that used in Comparative Example 4 were laminated in the same procedure as that used in Example 8, and thus an elliptically polarizing plate 18 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(19) Example 15

A polarizing plate II produced by the same method as that used in Example 8 and a retardation plate (type C, the thickness of the optically anisotropic layer: 1.72 μm) produced by the same method as that used in Example 6 were laminated in the same procedure as that used in Example 8, and thus an elliptically polarizing plate 19 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(20) Example 16

A polarizing plate II produced by the same method as that used in Example 8 and a retardation plate (type C, the thickness of the optically anisotropic layer: 1.76 μm) produced by the same method as that used in Example 7 were laminated in the same procedure as that used in Example 8, and thus an elliptically polarizing plate 20 was produced. The in-plane retardation value Re (λ) and the reflection chromaticity a* of the retardation plate of the resulting elliptically polarizing plate were measured by the same method as that used in Example 8. The calculated value of P(λ), P(450)/P(650), and the value of 1−P(450) calculated are shown in Table 2.

(21) Comparative Example 5

A retardation plate D containing a 0.93 m optically anisotropic layer was produced by the same method as that used in Comparative Example 1 except that composition D containing a polymerizable liquid crystal compound was prepared by incorporating no polymerizable liquid crystal compound A in the composition A containing a polymerizable liquid crystal compound of Comparative Example 1, using 12.0 parts by mass of the polymerizable liquid crystal compound B, and changing the amount of the solvent to 100 parts by mass and the thickness of the wire of the wire bar used in the application was changed to #7. This retardation plate did not satisfy the formula (3) and did not have reverse wavelength dispersion. The resulting retardation plate and a polarizing plate I produced by the same method as that used in Comparative Example 1 were laminated together in the same procedure as that used in Comparative Example 1, and thus an elliptically polarizing plate 21 was produced. The in-plane retardation value Re(λ) and the reflection chromaticity a* of the retardation plate of the resulting elliptically polarizing plate were calculated by the same method as that used in Comparative Example 1. The results are shown in Table 2.

(22) Comparative Example 6

A 0.99 μm-thick retardation plate (type D; the thickness of the optically anisotropic layer: 0.99 μm) was produced by the same method as that used in Comparative Example 5 except that the amount of the solvent used in the preparation of the composition D containing a polymerizable liquid crystal compound was changed to 100 parts by mass and the thickness of the wire of the wire bar used in the application was changed to #9. The resulting retardation plate and a polarizing plate I produced by the same method as that used in Comparative Example 1 were laminated together in the same procedure as that used in Comparative Example 1, and thus an elliptically polarizing plate 22 was produced. The in-plane retardation value Re (λ) and the reflection chromaticity a* of the retardation plate of the resulting elliptically polarizing plate were calculated by the same method as that used in Comparative Example 1. The results are shown in Table 2.

TABLE 1

| | | Optical characteristics of polarizing plate | | | | | |
|---|---|---|---|---|---|---|---|
| | | A2(450) | A1(450) | A2(550) | A1(550) | A2(650) | A1(650) |
| Polarizing plate | I (PVA type) | 4.7 | 0.07 | 4.9 | 0.03 | 5.0 | 0.03 |
| | II (Liquid crystal type) | 1.8 | 0.09 | 2.0 | 0.04 | 3.2 | 0.06 |

The polarizing plate I was a polarizing plate having a very neutral hue, and the polarizing plate II was a polarizing plate having a bluish hue.

TABLE 2

| | | Polarizing plate | Retardation plate | | | | Optical characteristics of elliptically polarizing plate | |
|---|---|---|---|---|---|---|---|---|
| | | | | Polymerizable liquid crystal compound | | Thickness of optically anisotropic | | |
| | | Type | Type | A (parts by mass) | B (parts by mass) | layer (μm) | Re(450) | Re(550) |
| Example | 1 | I | A | 12.0 | — | 2.42 | 119 | 145 |
| | 2 | I | A | 12.0 | — | 2.50 | 123 | 150 |
| | 3 | I | B | 10.5 | 1.5 | 1.93 | 117 | 135 |
| | 4 | I | B | 10.5 | 1.5 | 2.01 | 122 | 141 |
| | 5 | I | B | 10.5 | 1.5 | 2.14 | 130 | 150 |
| | 6 | I | C | 9.5 | 2.5 | 1.72 | 125 | 137 |
| | 7 | I | C | 9.5 | 2.5 | 1.76 | 130 | 141 |

TABLE 2-continued

|  |  |  |  |  |  |  |  |  |
|---|---|---|---|---|---|---|---|---|
|  | 8 | II | A | 12.0 | — | 2.17 | 106 | 130 |
|  | 9 | II | A | 12.0 | — | 2.28 | 112 | 137 |
|  | 10 | II | A | 12.0 | — | 2.42 | 119 | 145 |
|  | 11 | II | B | 10.5 | 1.5 | 1.86 | 113 | 130 |
|  | 12 | II | B | 10.5 | 1.5 | 1.93 | 117 | 135 |
|  | 13 | II | B | 10.5 | 1.5 | 2.01 | 122 | 141 |
|  | 14 | II | C | 9.5 | 2.5 | 1.61 | 119 | 129 |
|  | 15 | II | C | 9.5 | 2.5 | 1.72 | 125 | 137 |
|  | 16 | II | C | 9.5 | 2.5 | 1.76 | 130 | 141 |
| Comparative | 1 | I | A | 12.0 | — | 2.28 | 112 | 137 |
| Example | 2 | I | A | 12.0 | — | 2.17 | 106 | 130 |
|  | 3 | I | B | 10.5 | 1.5 | 1.86 | 113 | 130 |
|  | 4 | I | C | 9.5 | 2.5 | 1.61 | 119 | 129 |
|  | 5 | I | D | — | 12.0 | 0.93 | 141 | 130 |
|  | 6 | I | D | — | 12.0 | 0.99 | 151 | 139 |

| | | | Optical characteristics of elliptically polarizing plate | | | | | |
|---|---|---|---|---|---|---|---|---|
| | | Re(650) | Re(450)/ Re(550) | P(450) | P(550) | P(650) | P(450)/ P(650) | 1 − P(450) | Reflection chromaticity a* |

|  |  | Re(650) | Re(450)/Re(550) | P(450) | P(550) | P(650) | P(450)/P(650) | 1 − P(450) | Reflection chromaticity a* |
|---|---|---|---|---|---|---|---|---|---|
| Example | 1 | 148 | 0.82 | 0.91 | 0.92 | 0.87 | 1.05 | 0.08 | 0.7 |
|  | 2 | 154 | 0.82 | 0.86 | 0.87 | 0.92 | 0.94 | 0.13 | −1.3 |
|  | 3 | 138 | 0.87 | 0.94 | 0.97 | 0.79 | 1.19 | 0.06 | 1.9 |
|  | 4 | 143 | 0.87 | 0.88 | 0.97 | 0.83 | 1.06 | 0.12 | 0.4 |
|  | 5 | 153 | 0.87 | 0.78 | 0.87 | 0.91 | 0.86 | 0.22 | −2.8 |
|  | 6 | 140 | 0.91 | 0.84 | 0.99 | 0.80 | 1.04 | 0.16 | 1.2 |
|  | 7 | 144 | 0.92 | 0.78 | 0.96 | 0.83 | 0.94 | 0.22 | 0.4 |
|  | 8 | 134 | 0.82 | 0.74 | 0.79 | 0.75 | 0.99 | 0.21 | 1.9 |
|  | 9 | 141 | 0.82 | 0.76 | 0.81 | 0.81 | 0.94 | 0.20 | 1.2 |
|  | 10 | 150 | 0.82 | 0.74 | 0.79 | 0.88 | 0.85 | 0.21 | −1.1 |
|  | 11 | 133 | 0.87 | 0.76 | 0.79 | 0.74 | 1.02 | 0.20 | 1.8 |
|  | 12 | 138 | 0.87 | 0.75 | 0.81 | 0.78 | 0.96 | 0.21 | 0.2 |
|  | 13 | 143 | 0.87 | 0.73 | 0.81 | 0.82 | 0.89 | 0.23 | −0.3 |
|  | 14 | 131 | 0.92 | 0.75 | 0.79 | 0.73 | 1.02 | 0.21 | 1.3 |
|  | 15 | 139 | 0.91 | 0.72 | 0.81 | 0.79 | 0.91 | 0.24 | 0.2 |
|  | 16 | 144 | 0.92 | 0.69 | 0.81 | 0.83 | 0.83 | 0.26 | −0.7 |
| Comparative | 1 | 141 | 0.82 | 0.99 | 0.99 | 0.81 | 1.22 | 0.01 | 3.2 |
| Example | 2 | 134 | 0.82 | 0.91 | 0.92 | 0.76 | 1.21 | 0.08 | 5.1 |
|  | 3 | 133 | 0.87 | 0.99 | 0.92 | 0.75 | 1.32 | 0.01 | 4.3 |
|  | 4 | 131 | 0.92 | 0.92 | 0.90 | 0.74 | 1.25 | 0.08 | 3.7 |
|  | 5 | 127 | 1.08 | 0.66 | 0.92 | 0.71 | 0.94 | 0.25 | 22.4 |
|  | 6 | 136 | 1.09 | 0.57 | 0.98 | 0.77 | 0.74 | 0.35 | 14.4 |

The elliptically polarizing plates of Examples 1 to 16, which satisfy all the optical characteristics represented by the following formulae (1) to (4) were confirmed to be elliptically polarizing plates having small values of reflection chromaticity a* (values close to 0), having very neutral reflected colors, and having been improved in redness. On the other hand, the elliptically polarizing plates of Comparative Examples 1 to 4, which do not have the optical characteristic represented by the following formula (1), were elliptically polarizing plates being large in the value of reflection chromaticity a* and having a reddish reflected color. The elliptically polarizing plates of Comparative Examples 5 and 6, which do not satisfy the optical characteristic represented by formula (3) and do not have reverse wavelength dispersion, were elliptically polarizing plates being very large in the value of reflection chromaticity a* and having a very much reddish reflected color.

$$0.8 \leq P(450)/P(650) \leq 1.2 \tag{1}$$

$$P(550) \geq 0.7 \tag{2}$$

$$Re(450) < Re(550) < Re(650) \tag{3}$$

$$0.05 < 1 - P(450) < 0.3 \tag{4}$$

What is claimed is:

1. An elliptically polarizing plate comprising a polarizing plate and a retardation plate, the retardation plate being a layer formed of a polymer in the aligned state of a polymerizable liquid crystal compound, and satisfying the following formulae (1) through (4):

$$0.8 \leq P(450)/P(650) \leq 1.2 \tag{1}$$

$$P(550) \geq 0.7 \tag{2}$$

$$Re(450) < Re(550) < Re(650) \tag{3}$$

$$0.05 < 1 - P(450) < 0.3 \tag{4}$$

in formulae (1) through (4),

Re(450), Re(550) and Re(650) represent the front retardation of the retardation plate at a wavelengths ($\lambda$) of 450 nm, 550 nm and 650 nm, respectively, and P(450), P(550) and P(650) represent the elliptically polarized states (P($\lambda$)) with respect to light at wavelengths ($\lambda$) of 450 nm, 550 nm and 650 nm, respectively, where $P(\lambda) = \tan\{\sin^{-1}(I1(\lambda) \times \sin \Pi(\lambda) \times \sin 2\theta - I2(\lambda) \times \sin \Pi(\lambda) \times \cos 2\theta)/I2(\lambda))/2\}$, $I1(\lambda) = (10^{-A1(\lambda)} - 10^{-A2(\lambda)})/2$, $I2(\lambda) = (10^{-A1(\lambda)} + 10^{-A2(\lambda)})/2$, and $\Pi(\lambda) = Re(\lambda)/\lambda \times 2\pi$, wherein $A1(\lambda)$ represents the absorbance in the transmission axis direction of the polarizing plate at a wavelength of λ, A2(λ) represents the absorbance in the absorption axis direction of the polarizing plate at a wavelength of λ, Re(λ) represents the front retardation at a wavelength of λ, and θ represents the angle formed by the absorption axis of the polarizing plate and the slow axis of the retardation plate, wherein, the polymer in the aligned state of a polymerizable liquid crystal compound is produced by applying a composition containing the polymerizable liquid crystal compound to a substrate and performing polymerization of the polymerizable liquid crystal compound while it maintains its aligned state.

2. The elliptically polarizing plate according to claim 1, wherein the front retardation of the retardation plate at a wavelength of 550 nm satisfies the following formula (5):

$$130\ nm \leq Re(550) \leq 150\ nm \quad (5)$$

wherein Re (550) represents the front retardation at a wavelength of 550 nm.

3. The elliptically polarizing plate according to claim 1, wherein the absorbance in the absorption axis direction (A2) of the polarizing plate at a wavelength of λ satisfies the following formulae (6) through (8):

$$1 \leq A2(450) \leq 6 \quad (6)$$

$$1 \leq A2(550) \leq 6 \quad (7)$$

$$2 \leq A2(650) \leq 6 \quad (8).$$

4. The elliptically polarizing plate according to claim 1, wherein the absorbance in the transmission axis direction (A1) of the polarizing plate at a wavelength of λ satisfies the following formulae (9) through (11):

$$0.001 \leq A1(450) \leq 0.1 \quad (9)$$

$$0.001 \leq A1(550) \leq 0.1 \quad (10)$$

$$0.002 \leq A1(650) \leq 0.2 \quad (11).$$

5. The elliptically polarizing plate according to claim 1, wherein the absorbance in the absorption axis direction (A2) of the polarizing plate at a wavelength of λ satisfies the following formulae (12) and (13):

$$A2(650) > A2(450) \quad (12)$$

$$A2(650) > A2(550) \quad (13).$$

6. The elliptically polarizing plate according to claim 1, wherein the angle formed by the absorption axis of the polarizing plate and the slow axis of the retardation plate is in the range of 45°±5°.

7. The elliptically polarizing plate according to claim 1, wherein the polarizing plate comprises a polymer of the polymerizable liquid crystal compound which is polymerized in the aligned state of the mixture of the polymerizable liquid crystal compound and a dichroic dye.

8. A liquid crystal display device comprising the elliptically polarizing plate according to claim 1.

9. An organic EL display device comprising the elliptically polarizing plate according to claim 1.

* * * * *